(12) United States Patent
Hirose et al.

(10) Patent No.: US 12,337,940 B2
(45) Date of Patent: Jun. 24, 2025

(54) USAGE MANAGEMENT SYSTEM FOR SHIP PROPULSION APPARATUS, SHIP PROPULSION APPARATUS, USER TERMINAL DEVICE, AND USAGE RIGHTS MANAGEMENT SERVER

(71) Applicant: YAMAHA HATSUDOKI KABUSHIKI KAISHA, Iwata (JP)

(72) Inventors: Eiichi Hirose, Shizuoka (JP); Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 239 days.

(21) Appl. No.: 18/144,371

(22) Filed: May 8, 2023

(65) Prior Publication Data
US 2023/0271682 A1    Aug. 31, 2023

Related U.S. Application Data

(63) Continuation of application No. PCT/JP2021/020823, filed on Jun. 1, 2021.

(30) Foreign Application Priority Data

Nov. 17, 2020   (JP) ................. 2020-191146

(51) Int. Cl.
*B63B 79/00*   (2020.01)
*B63H 21/21*   (2006.01)
(Continued)

(52) U.S. Cl.
CPC ............. *B63B 79/00* (2020.01); *B63H 21/21* (2013.01); *F02P 11/04* (2013.01); *G06Q 30/0185* (2013.01)

(58) Field of Classification Search
CPC . B63B 79/00; B63B 2017/0009; B63H 21/21; B63H 20/00; B63H 2021/216;
(Continued)

(56) References Cited

U.S. PATENT DOCUMENTS

| 4,767,363 A | 8/1988 | Uchida et al. |
| 4,949,684 A | 8/1990 | Gohara |

(Continued)

FOREIGN PATENT DOCUMENTS

| CN | 104442705 A | 3/2015 |
| JP | 05-52412 B2 | 8/1993 |

(Continued)

OTHER PUBLICATIONS

Official Communication issued in International Patent Application No. PCT/JP2021/020823, mailed on Aug. 10, 2021.
(Continued)

*Primary Examiner* — Ashley L Redhead, Jr.
(74) *Attorney, Agent, or Firm* — Keating & Bennett, LLP

(57) ABSTRACT

A usage management system includes a use rights management server and a user terminal. A controller of a vessel propulsion apparatus operates a prime mover in a permission mode to permit an output exceeding a predetermined limit output if use permission is provided from the user terminal, and operates the prime mover in a non-permission mode to prohibit an output exceeding the predetermined limit output if use permission is not provided from the user terminal. The user terminal enters an active state to allow issuance of use permission if a use-permission notification is received from the use rights management server, and enters a non-active state to prohibit issuance of use permission if a use-permission notification is not received from the use rights management server. The use rights management server transmits a use-permission notification or a use-non-permission noti- (Continued)

fication in accordance with use rights information concerning the vessel propulsion apparatus.

15 Claims, 13 Drawing Sheets

(51) Int. Cl.
*F02P 11/04* (2006.01)
*G06Q 30/018* (2023.01)

(58) Field of Classification Search
CPC ....... F02P 11/04; F02P 1/086; G06Q 30/0185; G06Q 30/0645; G06Q 40/08; G06Q 50/40; G06Q 50/265; F02N 11/0807; F02D 29/02

See application file for complete search history.

(56) References Cited

U.S. PATENT DOCUMENTS

| | | | |
|---|---|---|---|
| 10,742,812 B1* | 8/2020 | Beavers | H04L 65/756 |
| 2002/0174077 A1 | 11/2002 | Yui et al. | |
| 2003/0064641 A1 | 4/2003 | Funayose et al. | |
| 2007/0136083 A1 | 6/2007 | Simon et al. | |
| 2010/0049385 A1 | 2/2010 | Bamba | |
| 2015/0348179 A1 | 12/2015 | Kamisawa | |
| 2017/0291672 A1* | 10/2017 | Maejima | B63H 21/21 |
| 2018/0032928 A1* | 2/2018 | Li | G06Q 50/40 |
| 2018/0252176 A1* | 9/2018 | Oguguo | F02B 37/00 |
| 2020/0369238 A1 | 11/2020 | Toyooka et al. | |
| 2021/0237683 A1 | 8/2021 | Nakashima et al. | |
| 2021/0278846 A1* | 9/2021 | Nickols | B63H 21/21 |
| 2022/0055729 A1* | 2/2022 | Matsuo | G05D 1/0022 |
| 2022/0414757 A1* | 12/2022 | Inoue | G06Q 50/06 |

FOREIGN PATENT DOCUMENTS

| | | |
|---|---|---|
| JP | 2647673 B2 | 8/1997 |
| JP | 2014-146120 A | 8/2014 |
| JP | 6238038 B1 | 11/2017 |
| JP | 6496896 B1 | 4/2019 |
| WO | 2006086536 A2 | 8/2006 |

OTHER PUBLICATIONS

Global Mobility Service Inc., "IoT x Fintech service demonstration project that creates employment by providing vehicles to people who do not pass the ASEAN auto loan credit examination", JETRO, Feb. 2018, 21 pages.

The Saikyo Bank, Ltd., "About the start of handling of private car loans using GPS devices", Feb. 13, 2018, 2 pages.

Nakashima, "Modern Business Model of Technique and Society: What is the Role of IoT Service as an Essential Solution for Social Challenges", IATSS Review, vol. 42, No. 2, Oct. 2017, pp. 95-101.

Official Communication issued in corresponding European Patent Application No. 21894239.9, mailed on May 6, 2024, 10 pages.

* cited by examiner

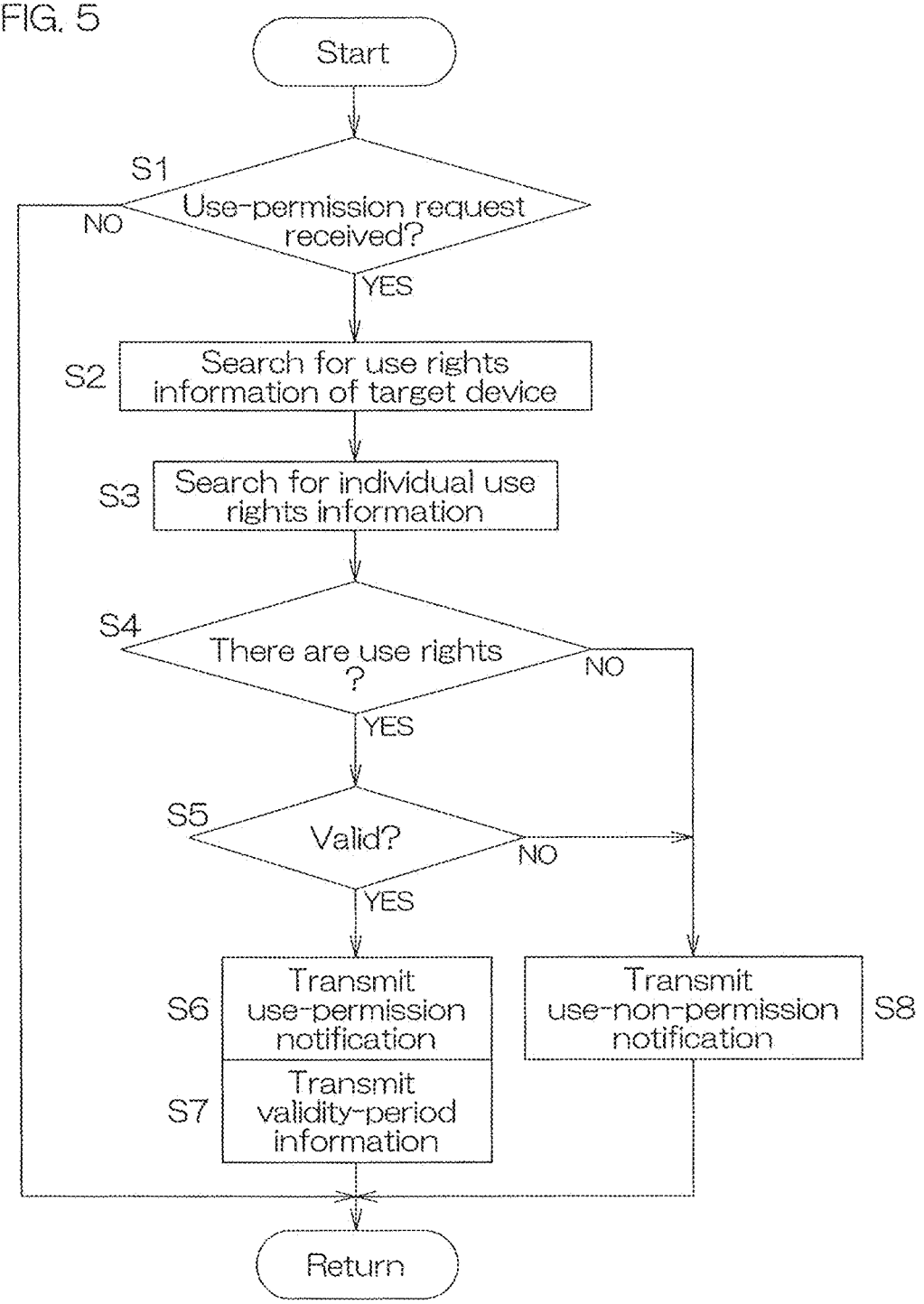

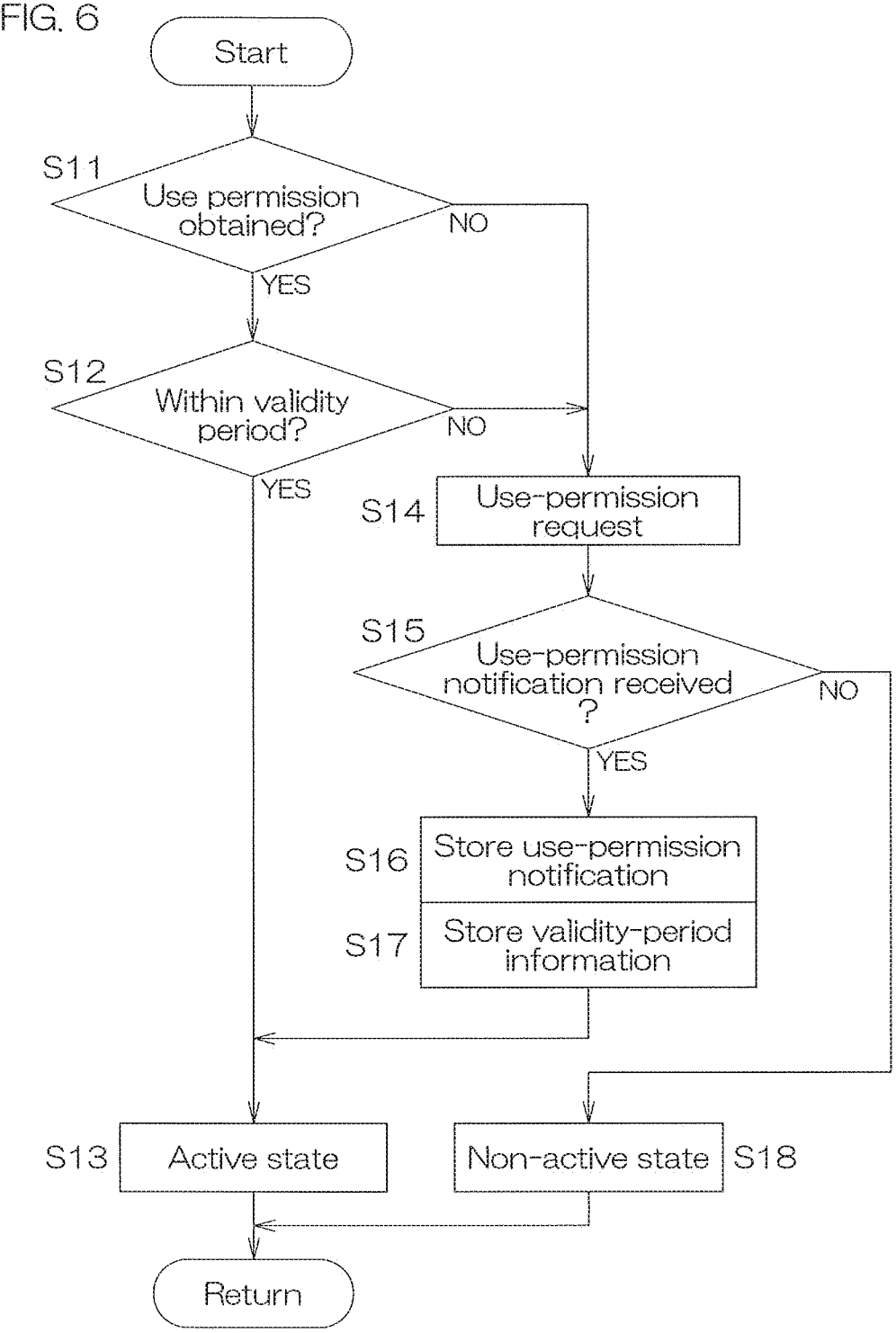

USAGE MANAGEMENT SYSTEM FOR SHIP PROPULSION APPARATUS, SHIP PROPULSION APPARATUS, USER TERMINAL DEVICE, AND USAGE RIGHTS MANAGEMENT SERVER

CROSS-REFERENCE TO RELATED APPLICATIONS

This application claims the benefit of priority to Japanese Patent Application No. 2020-191146 filed on Nov. 17, 2020 and is a Continuation application of PCT Application No. PCT/JP2021/020823 filed on Jun. 1, 2021. The entire contents of each application are hereby incorporated herein by reference.

BACKGROUND OF THE INVENTION

1. Field of the Invention

The present invention relates to a usage management system for vessel propulsion apparatuses. Additionally, the present invention relates to a vessel propulsion apparatus suitable for management under the usage management system. Still additionally, the present invention relates to a user terminal device suitable for the usage management system and to a use rights management server.

2. Description of the Related Art

Japanese Patent Application Publication No. 2014-146120 discloses a management system for automobile loans or automobile leases. Under this management system, a vehicle engine used by a customer who is in arrears in the payment of a loan fee or a lease expense cannot be started. In detail, the vehicle is provided with an engine-start update control unit. The engine-start update control unit includes a start update controller connected to a server through a communication line and a relay switch device connected to the start update controller and to an engine-start electrical system. Pieces of management data concerning the automobile loan or automobile lease of each customer are registered in the server. If the customer is in arrears in the payment of a loan fee or a lease expense, a nonpayment confirmation signal is input into the server. When the nonpayment confirmation signal is input, the server generates, with respect to a start update controller of a to-be-started vehicle, an engine-stop signal that brings about a lock state in which the vehicle engine cannot be started. The start update controller that has received the engine-stop signal causes both an ignition-related relay switch and a starter-related relay switch to switch to an open state. As a result, the lock state in which the engine cannot be started is brought about.

Japanese Patent Application Publication No. 2014-146120 describes a management system for automobile leases or automobile loans. Japanese Patent Application Publication No. 2014-146120 also refers to the application of the management system to a vessel including an engine-start-system, and yet does not describe such application in detail. In actuality, it is not appropriate to apply the management system of Japanese Patent Application Publication No. 2014-146120 directly to vessel leases or vessel loans.

For example, in a vessel, it will become impossible for the vessel to return to its port if the vessel stops on the sea far from the land, and thereafter enters a state in which a prime mover cannot be started. Therefore, in actuality, a management system, such as that described in Japanese Patent Application Publication No. 2014-146120 is not appropriately applied to a vessel.

SUMMARY OF THE INVENTION

Preferred Embodiments of the Present Invention provide usage management systems that are each able to appropriately manage the use of a vessel propulsion apparatus. Additionally, a preferred embodiment of the present invention provides a vessel propulsion apparatus suitable for management under the usage management system. Still additionally, a preferred embodiment of the present invention provides a user terminal and a use rights management server that are suitable for use under the usage management system mentioned above.

A preferred embodiment of the present invention provides a usage management system for a vessel propulsion apparatus, the usage management system including a use rights management server to manage use rights information of a vessel propulsion apparatus that provides a thrust to a vessel, and a user terminal to exchange data communication with the vessel propulsion apparatus and with the use rights management server. The vessel propulsion apparatus includes a thrust generator, a prime mover to drive the thrust generator, and a controller configured or programmed to communicate with the user terminal, to operate the prime mover in a permission mode to permit an output exceeding a predetermined limit output if use permission is provided from the user terminal, and to operate the prime mover in a non-permission mode to prohibit the output exceeding the predetermined limit output if use permission is not provided from the user terminal. The user terminal is operable to transmit a use-permission request with identifications of the vessel propulsion apparatus and a user to the use rights management server, to enter an active state to allow issuance of use permission to the controller if a use-permission notification is received from the use rights management server, and to enter a non-active state to prohibit issuance of use permission to the controller if a use-permission notification is not received from the use rights management server. The use rights management server is operable to refer to use rights information concerning the vessel propulsion apparatus when a use-permission request with identifications of the vessel propulsion apparatus and the user is received from the user terminal, and then transmit a use-permission notification or a use-non-permission notification to the user terminal in accordance with the use rights information.

According to above arrangement, the use rights information of the vessel propulsion apparatus is managed by the use rights management server. When a use-permission request is transmitted from the user terminal to the use rights management server, the use rights management server that has received this request refers to use rights information concerning the vessel propulsion apparatus, and then transmits a use-permission notification or a use-non-permission notification to the user terminal. The user terminal enters the active state if the use-permission notification is received from the use rights management server, and can provide use-permission to the controller of the vessel propulsion apparatus. If the user terminal does not receive the use-permission notification, the user terminal enters the non-active state, and cannot issue use-permission. If use-permission is provided from the user terminal, the controller of the vessel propulsion apparatus operates the prime mover in a permission mode, and if use-permission is not provided, the controller operates the prime mover in a non-permission mode. In the permission mode, prime mover output exceeding a predetermined limit output is permitted, and the vessel propulsion apparatus is able to generate a large thrust if necessary. In the non-permission mode, the prime mover output exceeding the predetermined limit output is prohibited, and the vessel propulsion apparatus cannot generate a large thrust although the vessel propulsion apparatus is able to generate some thrust.

Thus, it is possible to operate the prime mover in the permission mode or in the non-permission mode based on the use rights information managed by the use rights management server, thus making it possible to manage the use of the vessel propulsion apparatus. Additionally, it is possible to operate the prime mover within a range not exceeding the predetermined limit output, and is possible to generate a thrust from the vessel propulsion apparatus even in the non-permission mode. Therefore, the use regulation of the vessel propulsion apparatus does not disable the vessel to sail. Thus, it is possible to provide the usage management system that is able to appropriately manage the use of the vessel propulsion apparatus.

On the other hand, if the vessel propulsion apparatus is stolen, the vessel propulsion apparatus cannot be operated in the permission mode because use rights information of a thief is not registered in the use rights management server. The vessel propulsion apparatus in this state has a greatly-reduced value, and thus is less likely to become stolen. Therefore, it is possible to reduce or avoid the theft of the vessel propulsion apparatus.

In a preferred embodiment of the present invention, the prime mover includes an internal combustion engine. The prime mover includes a flywheel magneto to rotate in response to rotation of a crankshaft of the internal combustion engine, a charge coil to generate electricity by rotation of the flywheel magneto, an ignition coil to operate by electric power generated by the charge coil, a pulsar coil to generate an ignition timing signal in accordance with the rotation of the flywheel magneto, and an ignition plug that generates a spark discharge by power supply from the ignition coil. The controller is provided in a CDI (Capacitor Discharge Injection) ignition that passes an electric current through the ignition coil in accordance with the ignition timing signal generated by the pulsar coil and generates a spark discharge in the ignition plug. The controller is configured or programmed to execute an operation of the prime mover in the permission mode and in the non-permission mode by controlling a spark discharge from the ignition plug.

According to the above arrangement, the operation in the permission mode and in the non-permission mode is achieved by controlling the ignition of the internal combustion engine. The flywheel magneto rotates by the rotation of the crankshaft of the internal combustion engine, and, as a result, the charge coil generates electric power, and the ignition coil actuates by the electric power. On the other hand, the pulsar coil generates an ignition timing signal in accordance with the rotation of the flywheel magneto. The controller passes an electric current through the ignition coil, and generates a spark discharge in the ignition plug in accordance with the ignition timing signal. The controller controls the spark discharge generated by the ignition plug (more specifically, controls an electric current flowing through the ignition coil), and thus achieves the operation of the prime mover in the permission mode and in the non-permission mode. As thus described, it is possible to achieve the operation in the permission mode and in the non-permission mode by using the ignition system of the internal combustion engine.

If the controller is actuated by the electric power generated by the charge coil, the operation is able to be performed in the permission mode and in the non-permission mode without installing a battery, and therefore the use of the vessel propulsion apparatus is able to be appropriately managed even in a situation in which a battery is not provided.

In a preferred embodiment of the present invention, the CDI ignition includes an ignition disabling circuit to disable an operation that passes an electric current through the ignition coil in accordance with the ignition timing signal generated by the pulsar coil when a rotation speed of the prime mover reaches a rotation speed limit. The controller is configured or programmed to set a first rotation speed at the rotation speed limit in the permission mode and to set a second rotation speed lower than the first rotation speed in the non-permission mode.

According to the above arrangement, the ignition disabling circuit disables an ignition operation when the rotation speed of the prime mover reaches the rotation speed limit. As a result, the operation of the prime mover at a rotation speed exceeding the rotation speed limit is prohibited. The first rotation speed set in the permission mode is relatively high, and therefore the vessel propulsion apparatus is able to generate a large thrust. The second rotation speed set in the non-permission mode is relatively low, and therefore the vessel propulsion apparatus cannot generate a large thrust although it is possible to generate some thrust. As thus described, the operation is able to be performed in the permission mode and in the non-permission mode by use of the ignition disabling circuit, and the use of the vessel propulsion apparatus is able to be appropriately managed.

In a preferred embodiment of the present invention, the controller is configured or programmed to pass an electric current through the ignition coil at a timing subjected to a phase shift (for example, a phase shift based on the rotation speed of the prime mover) with respect to the ignition timing signal generated by the pulsar coil in the permission mode and to disable the phase shift in the non-permission mode.

According to the above arrangement, in the permission mode, an electric current is passed through the ignition coil at a timing at which a phase shift (for example, an appropriate phase shift based on the prime mover rotation speed) has been appropriately made with respect to the ignition timing signal, thus making it possible to ignite fuel at an appropriate timing and making it possible for the internal combustion engine to generate a large output. On the other hand, in the non-permission mode, the phase shift enters a disabled state, and therefore the ignition timing deviates from an optimal timing. Therefore, the internal combustion engine is not able to generate a large output. Thus, the enabled/disabled setting of a phase shift that optimizes an ignition timing makes it possible to perform the operation in the permission mode and in the non-permission mode, and makes it possible to appropriately manage the use of the vessel propulsion apparatus.

In a preferred embodiment of the present invention, the CDI ignition is detachably fixed to an engine block of the prime mover. An identification information tag that identifies the vessel propulsion apparatus is fixed to the engine block (more specifically, an identification information tag is undetachably fixed). The CDI ignition includes a readout unit that is connected to the controller and that reads out identification information (typically, individual identification information uniquely determined with respect to each individual vessel propulsion apparatus) from the identification information tag. The controller is configured or programmed to operate the prime mover in the non-permission mode when the readout unit does not read out pre-registered identification information (for example, identification information registered in this controller).

According to the above arrangement, the readout unit included in the CDI ignition reads out the identification information tag fixed to the engine block, and, if a readout result is not pre-registered identification information, the prime mover is operated in the non-permission mode. As thus described, the engine block and the CDI ignition are beforehand paired with each other according to identification information, and, if a thus-paired combination cannot be obtained, the prime mover cannot be operated in the permission mode. Therefore, even if the CDI ignition is transplanted from the single vessel propulsion apparatus to another vessel propulsion apparatus, the prime mover cannot be operated in the permission mode. Additionally, the identification information tag is fixed to the engine block, and cannot be detached from the engine block. More specifically, if attempts to detach the identification information tag from the engine block are made, the identification information tag or the engine block will be broken. Therefore, it is also impossible to transplant the CDI ignition and the identification information tag that have been paired with each other from the single vessel propulsion apparatus to another vessel propulsion apparatus. Therefore, it is impossible to circumvent the output limitation imposed by the non-permission mode by transplanting the CDI ignition, thus making it possible to appropriately manage the use of the vessel propulsion apparatus.

In a preferred embodiment of the present invention, the use rights management server is operable to issue a use-permission notification accompanied by validity-period information based on the use rights information. The user terminal is operable to determine whether a current time is within a validity period indicated by the validity-period information when the use-permission notification is accompanied by the validity-period information, and to enter the active state if the current time is within the validity period, and to enter the non-active state if the current time is outside the validity period.

According to the above arrangement, the use rights management server issues a use-permission notification accompanied by the validity-period information, and, in accordance with this, the user terminal enters the active state only when the current time is within a validity period indicated by the validity-period information. Therefore, the user terminal is able to issue a use-permission and provide it to the controller only within the validity period, and therefore the prime mover is able to be operated in the permission mode only within the validity period. If it is outside the validity period, the prime mover is able to be operated only in the non-permission mode, and only the generation of a small thrust is permitted. Thus, it is possible to limit the output of the prime mover based on the validity-period information, thus making it possible to appropriately manage the use of the vessel propulsion apparatus.

In a preferred embodiment of the present invention, the user terminal includes a storage to non-volatilely store the use-permission notification. The user terminal is operable to determine whether a current time is within a validity period indicated by the validity-period information when the use-permission notification stored in the storage is accompanied by the validity-period information, and to enter the active state if the current time is within the validity period, and to enter the non-active state if the current time is outside the validity period.

According to the above arrangement, a use-permission notification is able to be non-volatilely stored in the storage of the user terminal. Therefore, even when the vessel is far away from land and when the user terminal cannot communicate with the use rights management server, the user terminal reads out the use-permission notification held in the storage, and can reach the active state. Based on the validity-period information by which the use-permission notification is accompanied, the user terminal enters the active state within the validity period, and enters the non-active state outside the validity period. Thus, it is possible to operate the prime mover in the permission mode or in the non-permission mode based on the use-permission notification non-volatilely stored in the storage of the user terminal even when the user terminal is in a state in which the user terminal cannot communicate with the use rights management server.

In a preferred embodiment of the present invention, the use rights management server is operable to issue a use-permission notification accompanied by validity-period information based on the use rights information. The user terminal is operable to provide the validity-period information and use-permission to the controller when the use-permission notification is accompanied by the validity-period information. When use-permission and validity-period information are provided from the user terminal, the controller is configured or programmed to determine whether the current time is within the validity period indicated by the validity-period information when the operation of the prime mover is started, to operate the prime mover in the permission mode if the current time is within the validity period, and to operate the prime mover in the non-permission mode if the current time is outside the validity period.

According to the above arrangement, in the controller of the vessel propulsion apparatus, a determination is made based on the validity-period information, and the prime mover is operated in the permission mode within the validity period, and is operated in the non-permission mode outside the validity period. Therefore, the prime mover is able to be operated in the permission mode only within the validity period. If it is outside the validity period, the prime mover is able to be operated only in the non-permission mode, and only the generation of a small thrust is permitted. Thus, it is possible to limit the output of the prime mover based on the validity-period information, thus making it possible to appropriately manage the use of the vessel propulsion apparatus.

In a preferred embodiment of the present invention, the controller includes a storage to non-volatilely store the use-permission and the validity-period information. The controller is configured or programmed to, when the use-permission and the validity-period information are stored in the storage, to operate the prime mover in the permission mode without obtaining the use-permission from the user terminal within a validity period indicated by the validity-period information, and to operate the prime mover in the non-permission mode outside the validity period indicated by the validity-period information if the use-permission is not provided from the user terminal.

According to the above arrangement, use permission and validity-period information are able to be non-volatilely stored in the storage of the controller. Therefore, even when the vessel is far away from land and when the user terminal cannot communicate with the use rights management server and when the user terminal cannot issue use permission, the controller is able to read out the use permission held in the storage, and to operate the prime mover in the permission mode. When use-permission and validity-period information are stored in the storage, the controller operates the prime mover in the permission mode within the validity period and in the non-permission mode outside the validity period based on the validity-period information. Thus, it is possible to operate the prime mover in the permission mode or in the non-permission mode based on a use-permission notification non-volatilely stored in the storage of the controller even when the user terminal is in a state in which the user terminal cannot communicate with the use rights management server.

In a preferred embodiment of the present invention, the use rights information to which the use rights management server refers includes at least one among information concerning a loan payment situation of purchase money of the vessel propulsion apparatus, information concerning a payment situation of rental charges of the vessel propulsion apparatus, or information concerning a use period restriction of the vessel propulsion apparatus.

According to the above arrangement, the use rights management server issues a use-permission notification or a use-non-permission notification based on information concerning a loan payment situation, a rental-charges payment situation, a use period restriction, etc. The prime mover can be operated in the non-permission mode even when a use-non-permission notification is issued, and therefore the vessel is able to travel although a large thrust cannot be obtained. Thus, it is possible to appropriately limit the output of the prime mover, thus making it possible to appropriately manage the use of the vessel propulsion apparatus.

In a preferred embodiment of the present invention, the controller is configured or programmed to maintain the permission mode without changing to the non-permission mode while operating the prime mover in the permission mode.

According to the above arrangement, the controller does not change to the non-permission mode while the prime mover is being operated in the permission mode. Therefore, the output of the prime mover is not greatly reduced while the prime mover is being operated, and therefore the thrust of the vessel propulsion apparatus is not greatly reduced. Thus, it is possible to appropriately manage the use of the vessel propulsion apparatus while appropriately limiting the output of the prime mover.

Another preferred embodiment of the present invention provides a vessel propulsion apparatus to be managed by the usage management system having the above-described features. The vessel propulsion apparatus includes a thrust generator, a prime mover to drive the thrust generator, and a controller. The controller communicates with the user terminal, and operates the prime mover in a permission mode to permit an output exceeding a predetermined limit output if use permission is provided from the user terminal, and operates the prime mover in a non-permission mode to prohibit the output exceeding the predetermined limit output if use permission is not provided from the user terminal.

A preferred embodiment of the present invention provides a user terminal usable in the usage management system described above and that is able to exchange data communication with both the vessel propulsion apparatus and the use rights management server. The user terminal is operable to transmit a use-permission request with identifications of the vessel propulsion apparatus and a user to the use rights management server, to enter an active state to allow issuance of use permission to the controller if a use-permission notification is received from the use rights management server, and to enter a non-active state to prohibit issuance of use permission to the controller if a use-permission notification is not received from the use rights management server.

A preferred embodiment of the present invention provides a non-transitory storage medium including a computer program to allow a computer to function as the user terminal having the above-described features by being executed by the computer.

A preferred embodiment of the present invention provides a use rights management server usable in the usage management system having the above-described features and that is able to exchange data communication with the user terminal and to manage use rights information of the vessel propulsion apparatus. The use rights management server is operable to refer to use rights information concerning the vessel propulsion apparatus when a use-permission request that has identified the vessel propulsion apparatus and the user is received from the user terminal, and then transmit a use-permission notification or a use-non-permission notification to the user terminal in accordance with the use rights information.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a flowchart shown to describe an operation example concerning a use-permission notification of a use rights management server.

FIG. 6 is a flowchart shown to describe an operation example of a user terminal device.

DETAILED DESCRIPTION OF THE PREFERRED EMBODIMENTS

Figure 1:
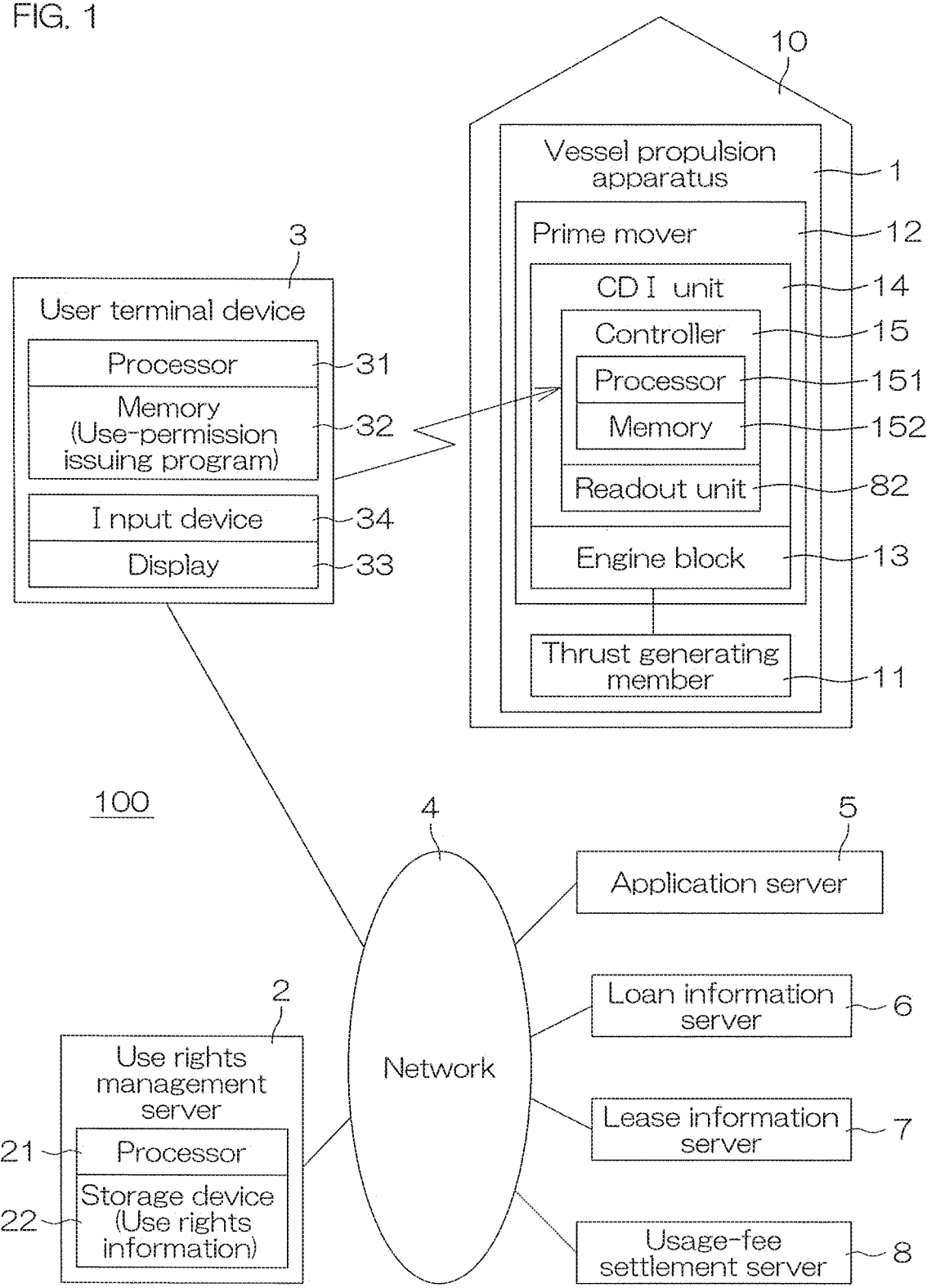
FIG. 1 is a block diagram shown to describe a configuration example of a usage management system for a vessel propulsion apparatus according to a preferred embodiment of the present invention.

FIG. 1 is a block diagram shown to describe a configuration example of a usage management system for a vessel propulsion apparatus according to a preferred embodiment of the present invention. The usage management system 100 manages the usage of the vessel propulsion apparatus 1. The usage management system 100 includes a use rights management server 2 and a user terminal device 3. The use rights management server 2 and the user terminal device 3 are connected to a network 4 that enables data communication. The network 4 provides a data communication path. The network 4 may include the Internet, and may include a local area network, and may include a mobile-phone communication network. Typically, the user terminal device 3 can be a mobile phone or other mobile information-processing terminal devices typified by a smartphone. Typically, the user terminal device 3 is connected to the network 4 by wireless communication.

The vessel propulsion apparatus 1 is mounted on a vessel 10 and provides a thrust to the vessel 10. The vessel propulsion apparatus 1 includes a thrust generating member 11, a prime mover 12 that drives the thrust generating member 11, and a controller 15 that drives (controls) the prime mover 12. Typically, the thrust generating member 11 is a propeller. The prime mover 12 can be an electric motor or an internal combustion engine. In the present preferred embodiment, the prime mover 12 is an internal combustion engine. More specifically, in the present preferred embodiment, the prime mover 12 is an internal combustion engine (for example, two-stroke internal combustion engine). The prime mover 12 includes an engine block 13 and a CDI (Capacitor Discharge Injection) unit 14 (CDI ignition device). In the present preferred embodiment, the controller 15 is incorporated into the CDI unit 14. The vessel propulsion apparatus 1 can be of various types, such as an outboard motor, an inboard/outboard motor, an inboard motor, or a jet propulsion machine. The vessel propulsion apparatus 1 is a subject of transaction independently of a hull, and is used by being attached to the hull by a boat builder, a dealer, or a user.

The controller 15 is configured or programmed to exchange data communication with the user terminal device 3. The data communication may be wireless communication (more specifically, near field communication, such as Wi-Fi (registered trademark), Bluetooth (registered trademark), or infrared communication), or may be wire-line communication. The controller 15 includes a processor 151 and a memory 152 (storage device). Preferably, the memory 152 includes a non-volatile memory device. The processor 151 executes a program stored in the memory 152, thus enabling the controller 15 to perform various functions. The functions include a function to drive (control) the prime mover 12 and a function to control communication with the user terminal device 3.

The controller 15 communicates with the user terminal device 3, and operates the prime mover 12 in a permission mode if the controller 15 receives use-permission from the user terminal device 3, whereas the controller 15 operates the prime mover 12 in a non-permission mode if the controller 15 does not receive use-permission from the user terminal device 3. The non-permission mode is an operation mode (control mode) in which the output of the prime mover 12 exceeding a predetermined limit output is prohibited. The permission mode is an operation mode (control mode) in which the output of the prime mover 12 exceeding the predetermined limit output is permitted. The predetermined limit output may be, for example, a rotation speed limit. Preferably, the rotation speed limit is set at, for example, about 2000 rpm. This makes it possible to provide a thrust to the vessel 10 even in the non-permission mode, and makes it possible to sail the vessel 10. However, it is impossible to sail the vessel 10 at high speed. In the permission mode, for example, the maximum output of the prime mover 12 is permitted, and it is possible to sail the vessel 10 at high speed.

The user terminal device 3 includes a processor 31 and a memory 32 (storage device), and is able to fulfill various functions by executing a program stored in the memory 32. Preferably, the memory 32 includes a non-volatile memory device. The user terminal device 3 additionally includes a display 33 and an input device 34 both of which provide User Interface. The input device 34 may be a touch panel disposed on a screen of the display 33, or may be a button provided separately from the display 33.

The user terminal device 3 is operable to exchange data communication through the network 4 and to download an application program from an application server 5 connected to the network 4 and then install the application program. In the present preferred embodiment, a use-permission issuing program that is one of the application programs is installed in the user terminal device 3. The execution of the use-permission issuing program by the processor 31 enables the user to issue and provide use-permission to the controller 15. The use-permission issuing program is able to take either one of an active state in which the issue of use-permission is allowable and a non-active state in which the issue of use-permission is prohibited. The function fulfilled by the use-permission issuing program includes a function to communicate with the use rights management server 2 and a function to transmit a use-permission request to the use rights management server 2 in addition to the function to issue use-permission. The function fulfilled by the use-permission issuing program additionally includes a function to receive a use-permission notification from the use rights management server 2 and a state control function to perform switching between an active state and a non-active state in accordance with the presence or absence of the reception of a use-permission notification. Therefore, the use-permission issuing program enters an active state if a use-permission notification is received from the use rights management server 2, and the use-permission issuing program enters a non-active state if a use-permission notification is not received from the use rights management server 2.

The use rights management server 2 includes a processor 21 and a storage device 22. Use rights information about the vessel propulsion apparatus 1 is stored in the storage device 22. Typically, use rights information of a plurality of vessel propulsion apparatuses 1 is stored in the storage device 22 of the use rights management server 2. The use rights information includes apparatus identification information of the vessel propulsion apparatus 1 (more specifically, identification information of the engine block 13), individual use rights information concerning use rights of an individual user, and other similar information. More specifically, the individual use rights information includes user identification information by which a user is identified, validity-period information that represents a period of time during which the user is allowed to use the vessel propulsion apparatus 1, and other similar information. It is possible to register a single user or a plurality of users, and when a plurality users are registered, individual use rights information is generated with respect to an individual user, and is stored in the storage device 22. The use rights information may include information (for example, an owner's name) concerning the property right of the vessel propulsion apparatus 1. Preferably, the use rights information additionally includes at least one among information concerning a loan payment situation of purchase money of the vessel propulsion apparatus 1, information concerning a payment situation of rental charges of the vessel propulsion apparatus 1, or information concerning a use period restriction of the vessel propulsion apparatus 1.

There is a case in which a user of the vessel propulsion apparatus 1 makes a loan contract for the purchase of the vessel propulsion apparatus 1. In this case, ownership of the vessel propulsion apparatus 1 belongs to a purchaser of the vessel propulsion apparatus 1. However, there is a case in which a loan company has ownership during loan repayment. Information concerning a loan repayment situation is managed in a loan information server 6. The loan information server 6 is connected to the network 4. The use rights management server 2 is able to exchange data communication with the loan information server 6 through the network 4. The use rights management server 2 transmits a loan information request including apparatus identification information to the loan information server 6. In response to this, the loan information server 6 transmits loan information corresponding to the apparatus identification information to the use rights management server 2. Loan information includes information concerning a loan repayment situation, and, more specifically, includes information concerning an already-repaid loan period. For example, in a contract to make a loan repayment by the month, information about already-repaid months is imparted to the use rights management server 2. If the loan has been completely repaid, information to this effect is imparted to the use rights management server 2. If necessary, the use rights management server 2 updates the validity-period information about the individual use rights information based on loan information that has been received. In other words, validity-period information up to the already-repaid month is registered. If the loan has been completely repaid, validity-period information representing an indefinite period is registered.

Even in a case in which the full amount of purchase money has been paid without a loan, validity-period information representing an indefinite period is likewise registered. Information in this case is registered by, for example, a dealer who sells the vessel propulsion apparatus 1.

There is a case in which the user selects a leasing contract to pay a monthly usage fee instead of the purchase of the vessel propulsion apparatus 1. Ownership of the vessel propulsion apparatus 1 belongs to a leasing company. Information concerning a lease-expense payment situation is managed in a lease information server 7. The lease information server 7 is connected to the network 4. The use rights management server 2 is able to exchange data communication with the lease information server 7 through the network 4. The use rights management server 2 transmits a lease information request including apparatus identification information to the lease information server 7. In response to this, the lease information server 7 transmits lease information corresponding to this apparatus identification information to the use rights management server 2. Lease information includes information concerning a lease-expense payment situation, and, more specifically, includes information concerning an already-paid lease expense period. For example, in a contract to make a lease-expense payment by the month, information about already-paid months is imparted to the use rights management server 2. If necessary, the use rights management server 2 updates the validity-period information about the individual use rights information based on lease information that has been received. In other words, validity-period information up to the already-paid month of the lease expense is registered.

There is a case in which a person having the ownership of the vessel propulsion apparatus 1 allows a third party other than the person to use the vessel propulsion apparatus 1 or the vessel 10 provided with the vessel propulsion apparatus 1. A typical case is rental of the vessel propulsion apparatus 1. The person having the ownership includes a person who has purchased the vessel propulsion apparatus 1 by a loan contract in addition to a person who has paid the full amount of purchase money of the vessel propulsion apparatus 1. The rental of the vessel propulsion apparatus 1 is performed by allowing a user who wants to rent the vessel propulsion apparatus 1 to obtain time-limited use rights by operating the user terminal device 3. More specifically, the user operates the user terminal device 3, and transmits a use-rights setting request including the apparatus identification information of the vessel propulsion apparatus 1, which the user wants to rent, to the use rights management server 2. The use-rights setting request includes information about a period during which the user wants to use the apparatus (desired use period). The use rights management server 2 ascertains whether the use of the vessel propulsion apparatus 1 has been reserved by another user in the desired use period, and, if not yet reserved, the use rights management server 2 imparts to the user terminal device 3 the information that it is possible to reserve the vessel propulsion apparatus 1, and also transmits a guide concerning procedures for settlement of the usage fee. For example, the user performs the procedures for settlement of the usage fee by operating the user terminal device 3 through a usage-fee settlement server 8 connected to the network 4. When the procedures for settlement of the usage fee are completed, a usage-fee paid-off notification is transmitted from the usage-fee settlement server 8 to the use rights management server 2. In response to this, the use rights management server 2 registers use rights information for this user while correlating to the identification information of this vessel propulsion apparatus 1. The use rights information is information that allows the user to use the vessel propulsion apparatus 1 during a validity period that is the desired use period. Thereafter, the use rights management server 2 imparts a use-permission, which is accompanied by validity-period information that sets a limited validity period, to the user terminal device 3.

Figure 2:
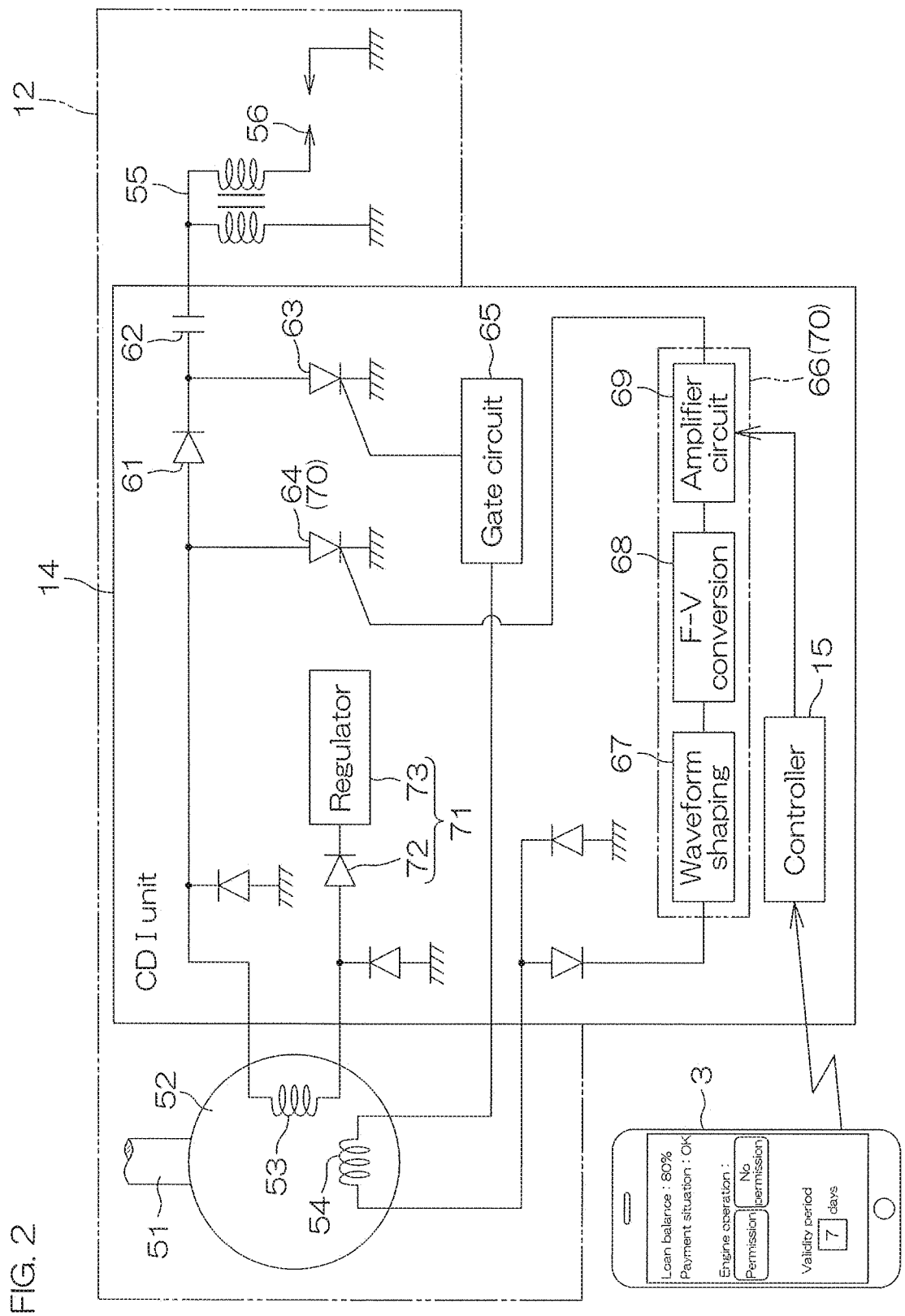
FIG. 2 shows a configuration example of a prime mover and a CDI unit both of which are included in the vessel propulsion apparatus.

FIG. 2 shows a configuration example of the prime mover 12 and the CDI unit 14. The engine block 13 includes structure serving as an internal combustion engine. The engine block 13 includes a flywheel magneto 52 that rotates in response to the rotation of a crankshaft 51. The engine block 13 additionally includes a charge coil 53 that generates electricity by the rotation of the flywheel magneto 52 and a pulsar coil 54 that generates an ignition timing signal in accordance with the rotation of the flywheel magneto 52. The engine block 13 additionally includes an ignition coil 55 and an ignition plug 56 that performs a spark discharge in a combustion chamber by the electric power supply from the ignition coil 55. The CDI unit 14 is fixed to the engine block 13. The controller 15 is incorporated into the CDI unit 14. The CDI unit 14 passes an electric current through the ignition coil 55 in accordance with a timing signal generated by the pulsar coil 54, and generates a spark discharge in the ignition plug 56.

The CDI unit 14 includes a rectifier diode 61 connected to an end of the charge coil 53 and a capacitor 62 connected in series to the rectifier diode 61. A primary side of the ignition coil 55 is connected to the capacitor 62. The ignition plug 56 is connected to a secondary side of the ignition coil 55. The CDI unit 14 additionally includes an ignition thyristor 63 (a switching device for ignition) connected in parallel with the capacitor 62 with respect to the rectifier diode 61 and an anti-ignition thyristor 64 (a switching device that stops ignition) connected in parallel with the rectifier diode 61 with respect to the charge coil 53. The ignition thyristor 63 is opened and closed by a gate circuit 65.

When an ignition timing signal is input from the pulsar coil 54, the gate circuit 65 responds to it, and energizes the ignition thyristor 63. The anti-ignition thyristor 64 is connected to an over-revolution determination circuit 66. The over-revolution determination circuit 66 is connected to the pulsar coil 54, and determines whether the prime mover 12 is in an over-revolution state based on a signal generated by the pulsar coil 54, and, if the prime mover 12 is in an over-revolution state, the over-revolution determination circuit 66 energizes the anti-ignition thyristor 64. The over-revolution determination circuit 66 includes a waveform shaping circuit 67 that applies a waveform shaping process to a signal generated by the pulsar coil 54, a frequency/voltage conversion circuit 68 that makes a frequency/voltage conversion (FV conversion) with respect to a signal generated by the waveform shaping circuit 67, and an amplifier circuit 69 that amplifies a voltage that is output by the frequency/voltage conversion circuit 68. The amplifier circuit 69 has a configuration that allows the amplification rate to be variable.

The controller 15 controls the amplification rate of the amplifier circuit 69. The frequency of a signal generated by the pulsar coil 54 is proportional to the rotation speed of the flywheel magneto 52, i.e., is proportional to the rotation speed of the crankshaft 51. Therefore, the frequency/voltage conversion circuit 68 generates a voltage that becomes higher in proportion to an increase in the prime mover rotation speed.

The CDI unit 14 additionally includes a power supply circuit 71 connected to another end of the charge coil 53. The power supply circuit 71 includes a rectifier circuit 72 that rectifies a voltage generated by the charge coil 53 and a regulator circuit 73 that generates a stable direct voltage from a voltage rectified by the rectifier circuit 72. The voltage generated by the power supply circuit 71 is supplied to electric/electronic circuits, such as the controller 15, the gate circuit 65, and the over-revolution determination circuit 66, that are disposed inside the CDI unit 14.

The flywheel magneto 52 rotates when the crankshaft 51 of the engine block 13 is rotated. As a result, the charge coil 53 generates an AC voltage. As a result, the power supply circuit 71 supplies a predetermined direct voltage to each element of the CDI unit 14, and thus the controller 15, the gate circuit 65, and the over-revolution determination circuit 66 are started. On the other hand, an AC voltage generated by the charge coil 53 is rectified by the rectifier diode 61, and the capacitor 62 is charged. On the other hand, the pulsar coil 54 generates an ignition timing signal whenever the crankshaft 51 reaches a predetermined rotation angle, and the ignition timing signal is supplied to the gate circuit 65. In response to this, the gate circuit 65 energizes the ignition thyristor 63, and the capacitor 62 is instantaneously discharged, and, in accordance with this, a large current change occurs on the primary side of the ignition coil 55. As a result, a high voltage is induced on the secondary side of the ignition coil 55, and a spark discharge occurs in the ignition plug 56.

When the prime mover 12 exceeds a predetermined rotation speed limit, and enters an over-revolution state, a gate control voltage generated from the amplifier circuit 69 exceeds a threshold value, and energizes the anti-ignition thyristor 64. As a result, the capacitor 62 is hindered from being charged, and therefore a state in which a spark discharge does not occur in the ignition coil 55 is brought about without depending on the operation of the gate circuit 65. Thus, the acceleration of the prime mover 12 is prohibited, thus making it impossible to operate the prime mover 12 exceeding the rotation speed limit. As thus described, the over-revolution determination circuit 66 and the anti-ignition thyristor 64 define an ignition disabling circuit 70 that disables an ignition operation performed by actuating the ignition coil 55.

The controller 15 sets a first amplification rate (for example, 1) in the amplifier circuit 69 when the prime mover 12 is operated in the permission mode. On the other hand, the controller 15 sets a second amplification rate (for example, 3) that is larger than the first amplification rate in the amplifier circuit 69 when the prime mover 12 is operated in the non-permission mode. The anti-ignition thyristor 64 is energized at a first rotation speed limit (for example, 6000 rpm) when the amplification rate of the amplifier circuit 69 is the first amplification rate. The anti-ignition thyristor 64 is energized at a second rotation speed limit (for example, 2000 rpm) lower than the first rotation speed limit when the amplification rate of the amplifier circuit 69 is the second amplification rate (for example, three or more times as high as the first amplification rate). Thus, a prime mover rotation speed exceeding the second rotation speed limit is permitted in the permission mode, and a prime mover rotation speed exceeding the second rotation speed limit is prohibited in the non-permission mode. In this way, the output of the prime mover 12 is able to be limited in the non-permission mode.

Figure 3:
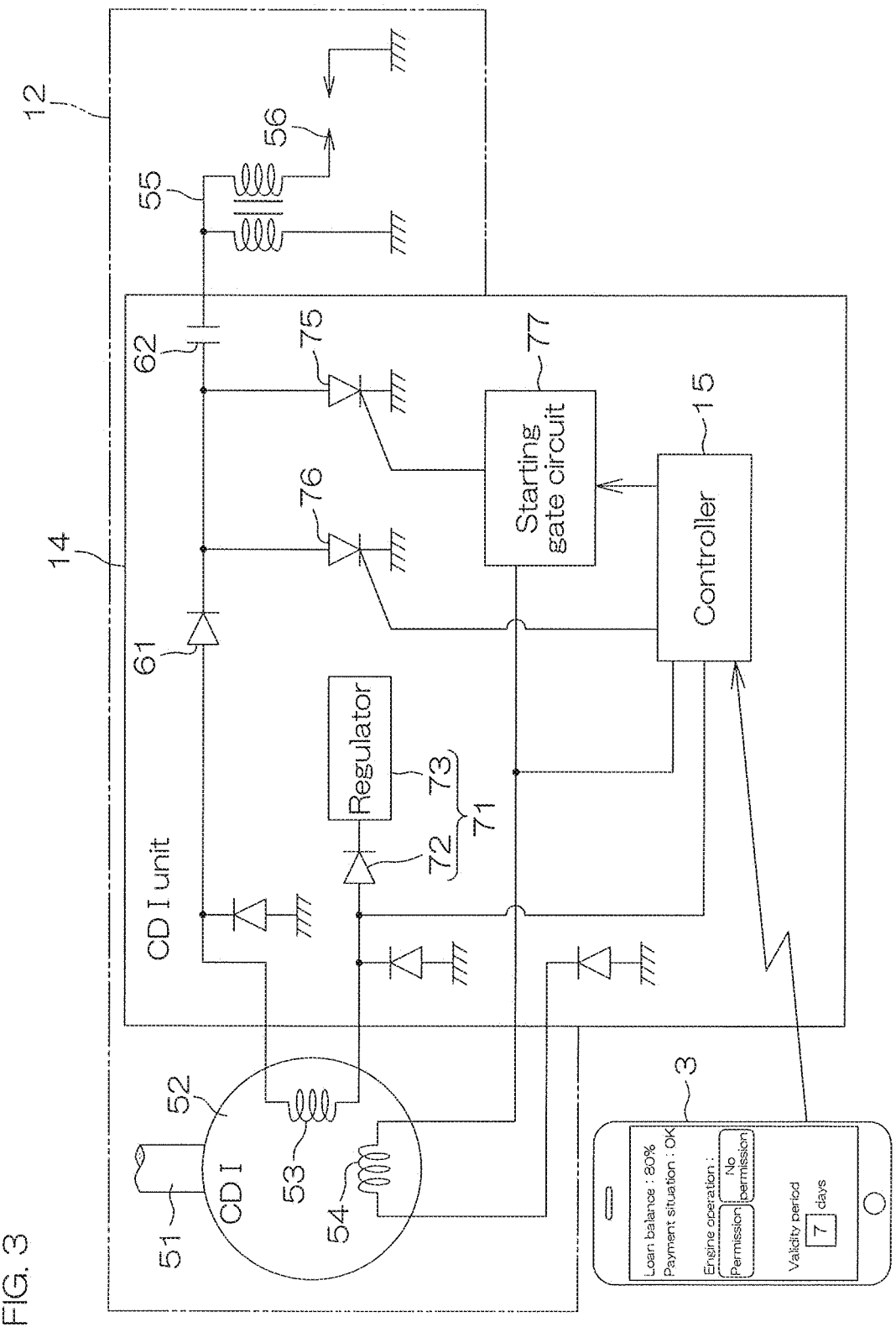
FIG. 3 shows another configuration example of the prime mover and the CDI unit.

FIG. 3 shows another configuration example of the CDI unit 14. In FIG. 3, the same reference sign as in FIG. 2 is assigned to a component equivalent to each component of FIG. 2. In this configuration example, a starting ignition thyristor 75 (a switching device for starting and igniting) and an operating ignition thyristor 76 (a switching device for operating and igniting) are connected together in parallel with each other between the rectifier diode 61 and the capacitor 62. Either of the ignition thyristors 75 and 76 is energized, and, as a result, the capacitor 62 is discharged, and a change in the electric current occurs on the primary side of the ignition coil 55, and, in accordance with this, a high voltage is induced on the secondary side of the ignition coil 55, and this high voltage allows the ignition plug 56 to generate a spark discharge.

A gate of the starting ignition thyristor 75 is connected to a starting gate circuit 77. On the other hand, a gate of the operating ignition thyristor 76 is connected to the controller 15. A direct voltage for operating the starting gate circuit 77 and the controller 15 is supplied from the power supply circuit 71.

In this configuration example, the pulsar coil 54 generates an ignition timing signal at a timing optimized for start-up. The ignition timing optimized for start-up is not necessarily an optimal ignition timing when the prime mover 12 is ordinarily operated after the completion of starting. Therefore, when the prime mover 12 is started, the starting gate circuit 77 energizes the starting ignition thyristor 75 in response to an ignition timing generated by the pulsar coil 54. On the other hand, when the start of the prime mover 12 is completed, the controller 15 disables the starting gate circuit 77, and maintains the starting ignition thyristor 75 in an OFF state. Additionally, the controller 15 energizes the operating ignition thyristor 76 at a timing that has been phase-shifted by a phase pre-optimized in accordance with a prime mover rotation speed with respect to an ignition timing generated by the pulsar coil 54.

More specifically, a signal generated by the charge coil 53 is input into the controller 15, and, when an ignition timing signal is received from the pulsar coil 54, a signal input from the charge coil 53 is calculated, and the operating ignition thyristor 76 is energized at a timing that has been appropriately phase-shifted. The controller 15 calculates the prime mover rotation speed based on the frequency of the signal generated by the charge coil 53, and achieves a phase shift corresponding to the prime mover rotation speed. In this way, it is possible to generate a spark discharge of the ignition plug 56 at an optimal timing after the completion of the start of the prime mover as well.

When the prime mover 12 is operated in the permission mode, the controller 15 disables the starting gate circuit 77 after completing the start of the prime mover 12, and energizes the operating ignition thyristor 76 at a timing that has been appropriately phase-shifted with respect to an ignition timing signal. On the other hand, when the prime mover 12 is operated in the non-permission mode, the controller 15 enables the starting gate circuit 77 even after completing the start of the prime mover 12, and maintains the operating ignition thyristor 76 in the OFF state without controlling the operating ignition thyristor 76. Alternatively, when the prime mover 12 is operated in the non-permission mode, the controller 15 may perform a control such that the starting gate circuit 77 is disabled after completing the start of the prime mover 12 and, without performing a phase shift as described above, the operating ignition thyristor 76 is energized at a timing at which an ignition timing signal is generated.

While an ignition timing signal generated by the pulsar coil 54 provides an ignition timing optimized for start-up, the ignition timing signal is not optimum for operation after completing the start of the prime mover 12. Thus, if ignition is performed at a timing of an ignition timing signal generated by the pulsar coil 54 after completing the start of the prime mover 12, the prime mover 12 cannot generate an output that exceeds predetermined limit output. Therefore, the prime mover output exceeding the predetermined limit output is permitted in the permission mode, whereas the prime mover output exceeding the predetermined limit output is prohibited in the non-permission mode.

Figure 4B:
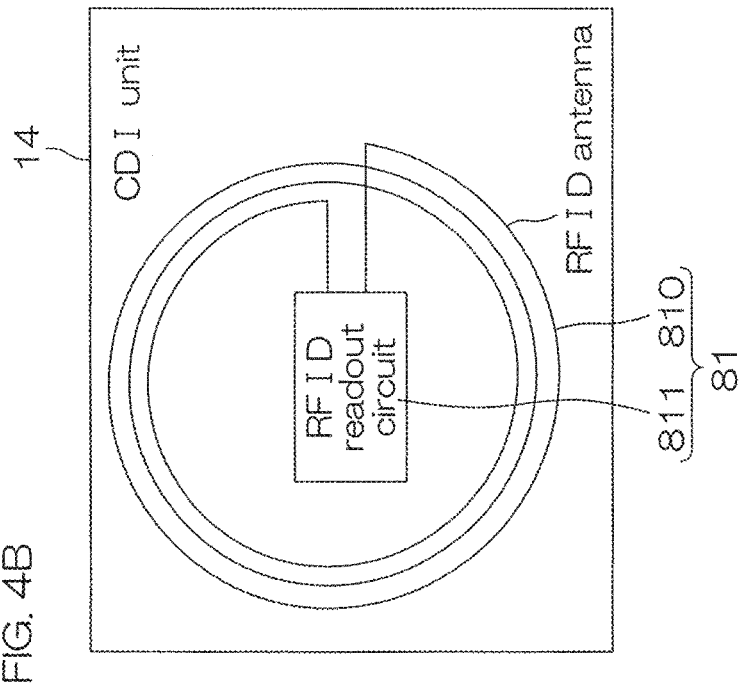
FIGS. 4A and 4B are views shown to describe an example of characteristics concerning the attachment of the CDI unit to an engine block.
Figure 4A:
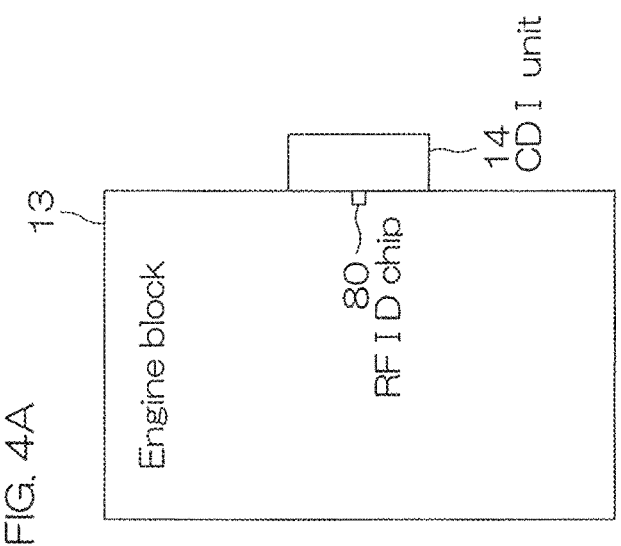

FIGS. 4A and 4B are views shown to describe an example of characteristics concerning the attachment of the CDI unit 14 to the engine block 13. The CDI unit 14 is detachably fixed to the engine block 13 in preparation for replacement when broken. An identification information tag 80 that stores the apparatus identification information of the vessel propulsion apparatus 1 is fixed to the engine block 13. The identification information tag 80 may be, for example, an RFID (Radio Frequency IDentifier) chip that stores the apparatus identification information. The apparatus identification information is individual identification information to uniquely identify the vessel propulsion apparatus 1.

The identification information tag 80 is fixed to the engine block 13 in an undetachable state. The undetachable state denotes a state in which the identification information tag 80 cannot be detached from the engine block 13 without breaking the identification information tag 80 or the engine block 13. For example, the identification information tag 80 may be buried and fixed in the engine block 13.

The CDI unit 14 includes a readout unit 81 that reads out apparatus identification information from the identification information tag 80. The readout unit 81 includes, for example, an RFID antenna 810 and an RFID readout circuit 811 connected to the RFID antenna 810 as shown in FIG. 4B. The readout unit 81 is connected to the controller 15, and is configured to supply information, which has been read out, to the controller 15.

The apparatus identification information is pre-stored in a nonvolatile storage area of the memory 152 inside the controller 15. When started, the controller 15 allows the readout unit 81 to read out the identification information tag 80. Thereafter, the prime mover 12 is operated in the non-permission mode if apparatus identification information read out by the readout unit 81 does not coincide with the apparatus identification information stored in the memory 152. The permission mode is allowed if the apparatus identification information read out by the readout unit 81 coincides with the apparatus identification information stored in the memory 152.

FIG. 5 is a flowchart shown to describe an operation example concerning a use-permission notification of the use rights management server 2. When the use rights management server 2 receives a use-permission request from the user terminal device 3 (step S1: YES), a target vessel propulsion apparatus 1 is identified based on apparatus identification information included in this use-permission request. Thereafter, use rights information stored concerning this vessel propulsion apparatus 1 is searched (step S2). The use rights management server 2 further searches individual use rights information of a corresponding user based on user identification information included in the use-permission request (step S3). Based on this individual use rights information, it is determined whether this user has use rights with respect to the vessel propulsion apparatus 1 (step S4).

If there is no corresponding individual use rights information (step S4: NO), it is determined that there are no use rights, and a use-non-permission notification is transmitted to the user terminal device 3 (step S8). If there is individual use rights information and, based on this, the existence of valid use rights is ascertained (step S4: YES and step S5: YES), a use-permission notification is transmitted to the user terminal device 3 (step S6).

If a validity period is set in the use rights, validity-period information is also transmitted (step S7). If there are no valid use rights (S4: NO or step S5: NO), for example, if the validity period is already over, a use-non-permission notification is transmitted to the user terminal device 3 (step S8).

FIG. 6 is a flowchart shown to describe an operation example of the user terminal device 3. When the user starts the use-permission issuing program by operating the user terminal device 3, the user terminal device 3 determines whether a use-permission has already been obtained and has been registered in the memory 32 (step S11). If the use-permission has already been obtained (step S11: YES), the user terminal device 3 examines validity-period information of the use-permission, and determines whether the current time is within the validity period (step S12). Preferably, the current time is obtained from a clock built into the user terminal device 3. If the use-permission has already been obtained (step S11: YES) and is within the validity period (step S12: YES), the user terminal device 3 sets the use-permission program in an active state (step S13).

On the other hand, if the use-permission has not yet been obtained (step S11: NO) or if the current time is outside the validity period of the use-permission (step S12: NO), the user terminal device 3 transmits a use-permission request to the use rights management server 2 (step S14). The use-permission request includes apparatus identification information of the vessel propulsion apparatus 1 to be used by the user and user identification information. In response to this, the use rights management server 2 transmits a use-permission notification or a use-non-permission notification to the user terminal device 3 as described above. When the user terminal device 3 receives the use-permission notification (step S15: YES), the user terminal device 3 registers use-permission information included in the use-permission notification in the memory 32 (step S16). If the use-permission notification is accompanied by validity-period information, this validity-period information is also registered in the memory 32 (step S17). Thereafter, the user terminal device 3 sets the use-permission program in an active state (step S13). Preferably, the register of both the use-permission information and the validity-period information is storage into a nonvolatile storage area of the memory 32, i.e., is nonvolatile storage.

If the user terminal device 3 receives a use-non-permission notification from the use rights management server 2 (step S15: NO), the user terminal device 3 sets the use-permission program in a non-active state (step S18).

Figure 7:
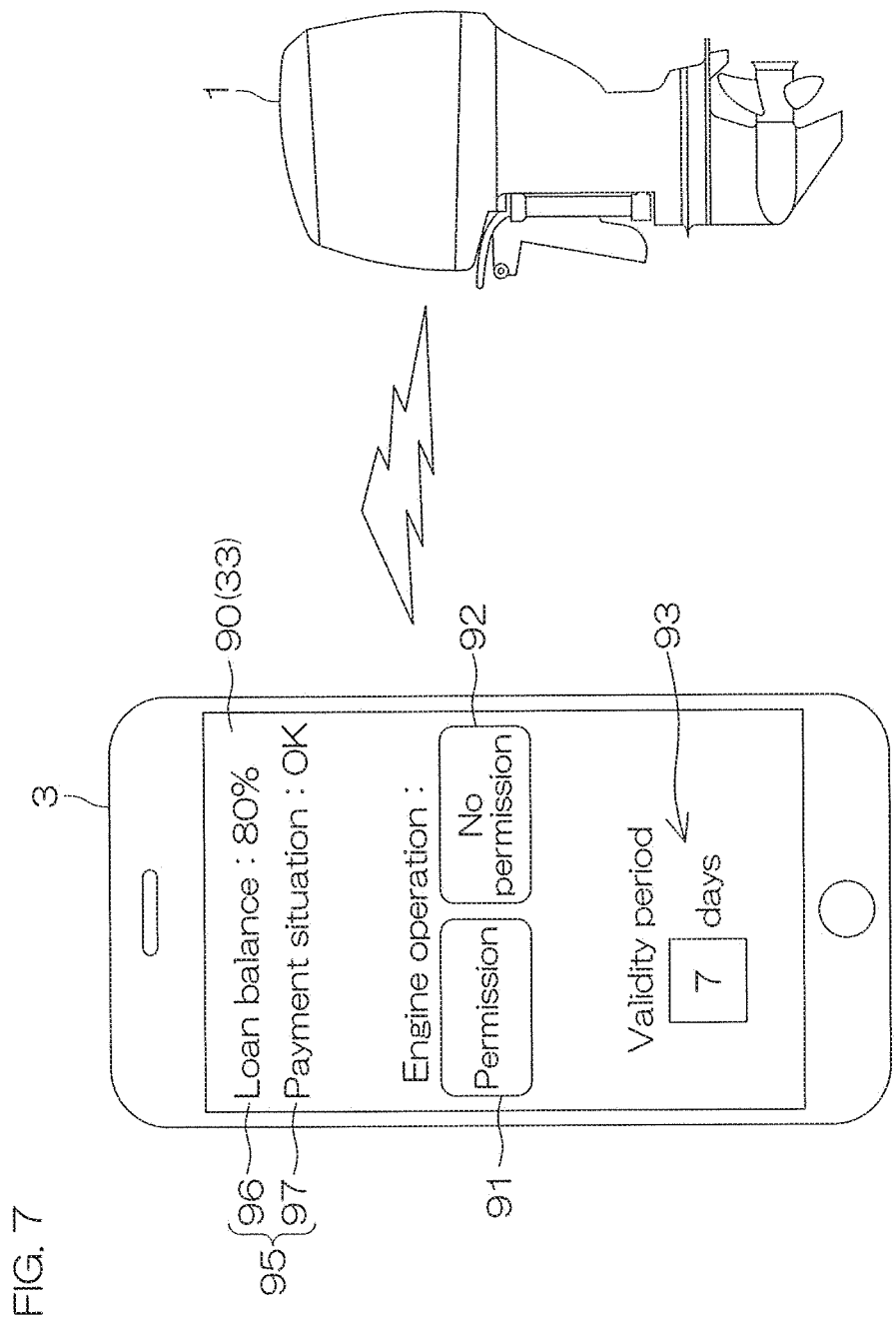
FIG. 7 shows an example of a display screen of the user terminal device.

FIG. 7 shows an example of a display screen of the user terminal device 3. A display screen 90 displayed on the display 33 when the use-permission program is being executed is shown. The display screen 90 includes a permission button 91 that permits the use of the vessel propulsion apparatus 1, a non-permission button 92 that disallows the use of the vessel propulsion apparatus 1, and a display 93 concerning a validity period during which the operation is permitted. The display screen 90 additionally includes a loan situation display 95 concerning a loan situation.

The loan situation display 95 includes, for example, a display 96 concerning a loan balance and a payment situation display 97 that represents whether a payment is being made without arrearage. The display 93 concerning a validity period may be a display of the number of remaining days during which the use-permission is valid. Additionally, the display 93 concerning a validity period may be a display of the last day of the validity period. Additionally, the display 93 concerning a validity period may be a display indicated by, for example, 2-hour unit, 1-hour unit, 30-minute unit, 15-minute unit, 5-minute unit, or 1-minute unit.

The permission button 91 is an operation portion operated by the user when a use-permission is provided to the vessel propulsion apparatus 1. The user terminal device 3 transmits a use-permission and validity-period information to the vessel propulsion apparatus 1 by operating the permission button 91. Thus, the vessel propulsion apparatus 1 enters an operable state in the permission mode.

The non-permission button 92 is operable by the user when a use non-permission is provided to the vessel propulsion apparatus 1. The user terminal device 3 transmits a use non-permission to the vessel propulsion apparatus 1 by operating the non-permission button 92. Thus, the vessel propulsion apparatus 1 cannot be operated in the permission mode, and enters a state in which only the operation in the non-permission mode is permitted.

The permission button 91 and the non-permission button 92 reach active states, respectively, and respond to the operation of the user if the use-permission program is set in an active state. When the use-permission program is in a non-active state, the permission button 91 and the non-permission button 92 reach non-active states, respectively, and do not respond to the operation of the user. The permission button 91 and the non-permission button 92 are configured to be each displayed in mutually-different modes depending on whether these buttons are in an active state or in a non-active state so that the active state/non-active state are imparted to the user.

Figure 8:
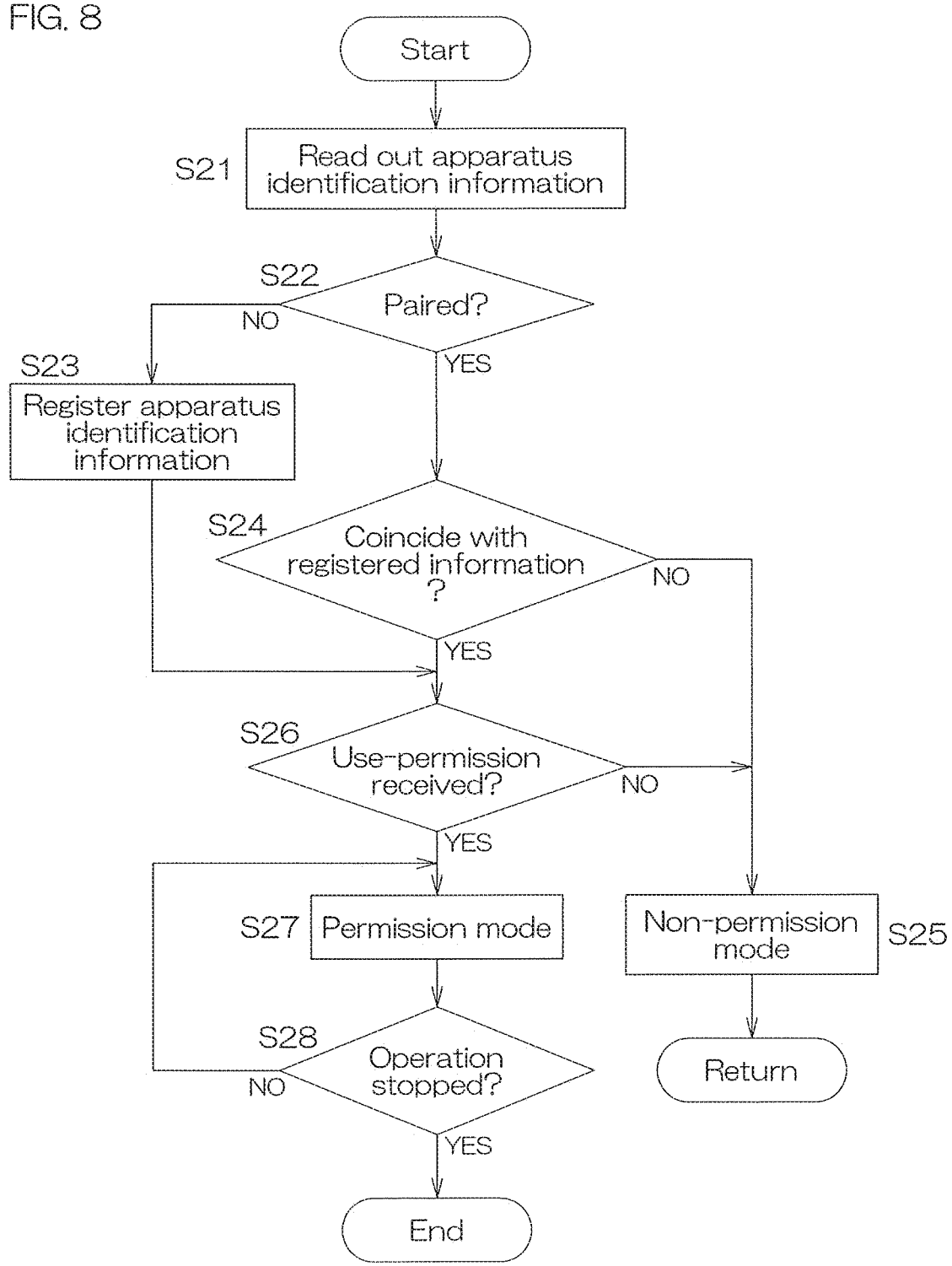
FIG. 8 is a flowchart shown to describe a processing example of a controller of the vessel propulsion apparatus.

FIG. 8 is a flowchart shown to describe a processing example of the controller 15 of the vessel propulsion apparatus 1. When the crankshaft 51 rotates, and, in accordance with this, the flywheel magneto 52 rotates, the charge coil 53 generates electric power. As a result, an operation voltage is supplied to the controller 15, and thus the controller 15 starts. Then, the controller 15 obtains a readout result of the identification information tag 80 from the readout unit 81, i.e., obtains apparatus identification information from the readout unit 81 (step S21).

The controller 15 determines whether the apparatus identification information has already been registered in the memory 152 (i.e., whether pairing has already been performed) (step S22). If the apparatus identification information has not yet been registered (step S22: NO), the controller 15 registers apparatus identification information, which has been read out from the identification information tag 80 by the readout unit 81, in the memory 152 (step S23). Thus, the CDI unit 14 and the identification information tag 80 are subjected to pairing. Thereafter, the process proceeds to step S26.

If pairing has already been performed, i.e., if the apparatus identification information has already been registered in the memory 152 (step S22: YES), the controller 15 determines whether the read-out apparatus identification information coincides with the apparatus identification information registered in the memory 152 (step S24). If it does not coincide (step S24: NO), the controller 15 sets the operation mode in a non-permission mode (step S25), and returns to step S21.

If the apparatus identification information read out by the readout unit 81 and the apparatus identification information registered in the memory 152 coincide with each other (step S24: YES), the controller 15 determines whether a use-permission has been received from the user terminal device 3 (step S26). If a use-permission has not been received (including a case in which a use non-permission has been received) (step S26: NO), the controller 15 sets the operation mode in a non-permission mode, and returns to step S21.

If a use-permission has been received from the user terminal device 3 (step S26: YES), the controller 15 sets the operation mode in a permission mode (step S27). Thereafter, the controller 15 maintains the operation mode in the permission mode until the operation of the prime mover 12 is stopped (step S28).

Figure 9:
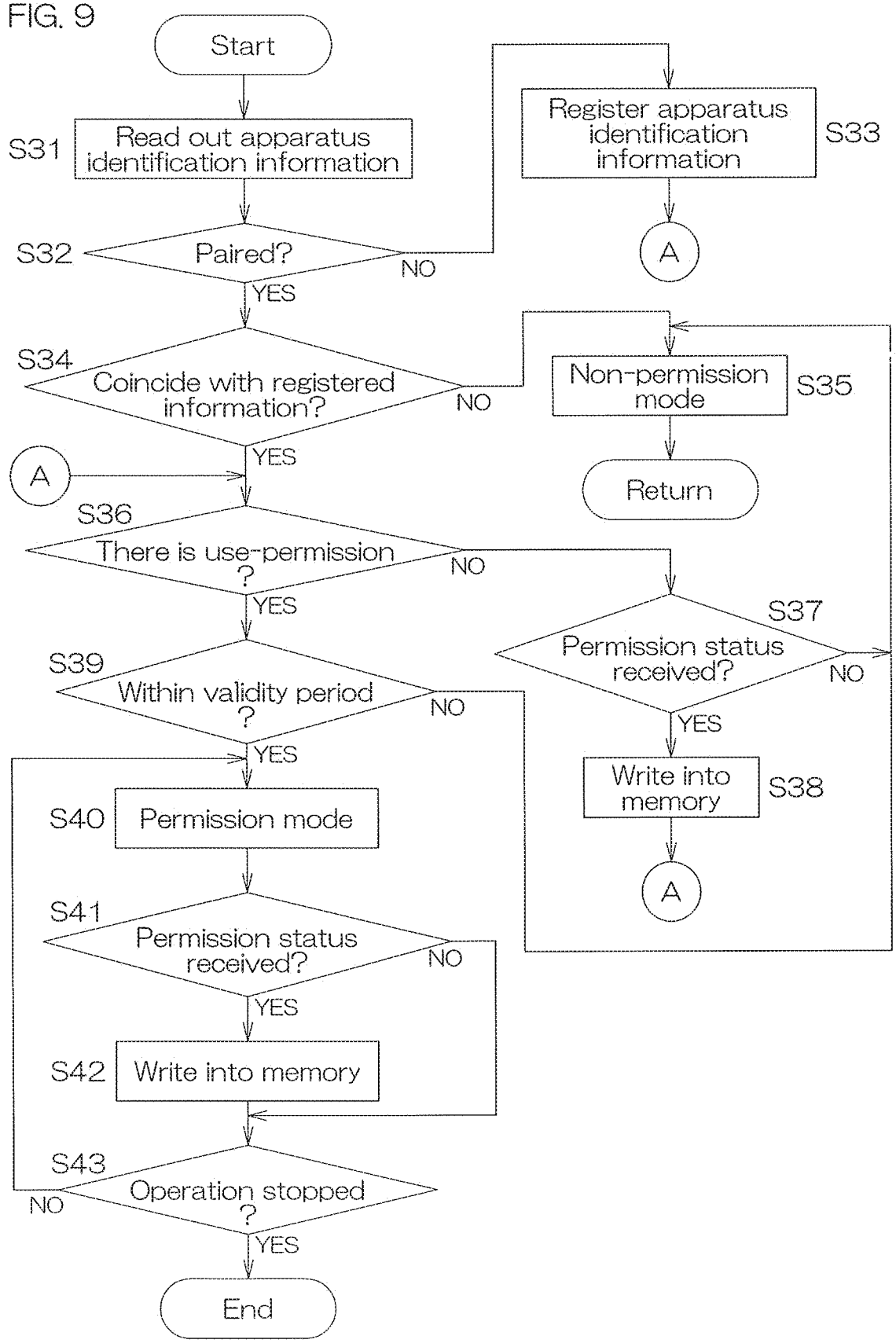
FIG. 9 is a flowchart shown to describe another processing example of the controller of the vessel propulsion apparatus.

FIG. 9 is a flowchart shown to describe another processing example of the controller 15 of the vessel propulsion apparatus 1. In this example, the controller 15 receives permission status information from the user terminal device 3, and stores this information in the memory 152. Preferably, the permission status information is stored in the nonvolatile storage area of the memory 152, i.e., the permission status information is stored non-volatilely. If permission status information is newly received in a state in which permission status information has already been registered in the memory 152, the previous permission status information is overwritten with the new permission status information by the controller 15. When the permission button 91 is pushed, the user terminal device 3 transmits permission status information that represents use-permission and expiration-date information to the vessel propulsion apparatus 1. When the non-permission button 92 is pushed, the user terminal device 3 transmits permission status information that represents use non-permission to the vessel propulsion apparatus 1.

When the crankshaft 51 rotates, and, in accordance with this, the flywheel magneto 52 rotates, the charge coil 53 generates electric power. As a result, an operation voltage is supplied to the controller 15, and thus the controller 15 starts. Then, the controller 15 obtains a readout result of the identification information tag 80 from the readout unit 81, i.e., obtains apparatus identification information from the readout unit 81 (step S31).

The controller 15 determines whether apparatus identification information has already been registered in the memory 152 (pairing has already been performed) (step S32). If apparatus identification information has not yet been registered (step S32: NO), the controller 15 registers apparatus identification information read out from the identification information tag 80 by the readout unit 81 in the memory 152 (step S33). Thus, the CDI unit 14 and the identification information tag 80 are subjected to pairing. Thereafter, the process proceeds to step S36.

If the pairing has already been performed, i.e., if the apparatus identification information has already been registered in the memory 152 (step S32: YES), the controller 15 determines whether the read-out apparatus identification information coincides with apparatus identification information pre-registered in the memory 152 (step S34). If it does not coincide (step S34: NO), the controller 15 sets the operation mode in a non-permission mode and then returns (step S35), and repeatedly performs the process from step S31.

If the apparatus identification information read out by the readout unit 81 and the apparatus identification information registered in the memory 152 coincide with each other (step S34: YES), the controller 15 refers to the permission status information of the memory 152, and determines whether use-permission has been provided (step S36). If use-permission has not been provided (including a case in which the permission status information represents use non-permission) (step S36: NO), the controller 15 determines whether the permission status information has been received from the user terminal device 3 (step S37). If the permission status information has not been received (step S37: NO), the controller 15 sets the operation mode in a non-permission mode and then returns (step S35), and repeatedly performs the process from step S31. If the permission status information has been received (step S37: YES), the controller 15 writes the received permission status information in the nonvolatile storage area of the memory 152, and updates the permission status information in the memory 152 (step S38). Thereafter, the process of the controller 15 returns to step S34.

If the controller 15 refers to the permission status information, and determines that use-permission has been provided (step S36: YES), the controller 15 additionally refers to the validity-period information, and determines whether the current time is within the validity period (step S39). The current time may be obtained from a clock built into the controller 15. If the current time is outside the validity period (step S39: NO), the controller 15 sets the operation mode in a non-permission mode, and returns (step S35).

If use-permission has been provided (step S35: YES) and if the current time is within the validity period (step S39: YES), the controller 15 sets the operation mode in a permission mode (step S40). Thereafter, the controller 15 maintains the operation mode in the permission mode until the operation of the prime mover 12 is stopped (step S43).

If new permission status information is received while the prime mover 12 is operating in the permission mode (step S41), the controller 15 writes the new permission status information in the nonvolatile storage area of the memory 152, and updates the permission status information in the memory 152 (step S42). Even when this updated permission status information represents use non-permission, the permission mode is maintained until the operation of the prime mover 12 is stopped. Thereafter, when the operation of the prime mover 12 is stopped and the prime mover 12 is started next time, the controller 15 determines that use-permission has not been provided (step S36: NO), and sets the operation mode in a non-permission mode (step S35).

Figure 10:
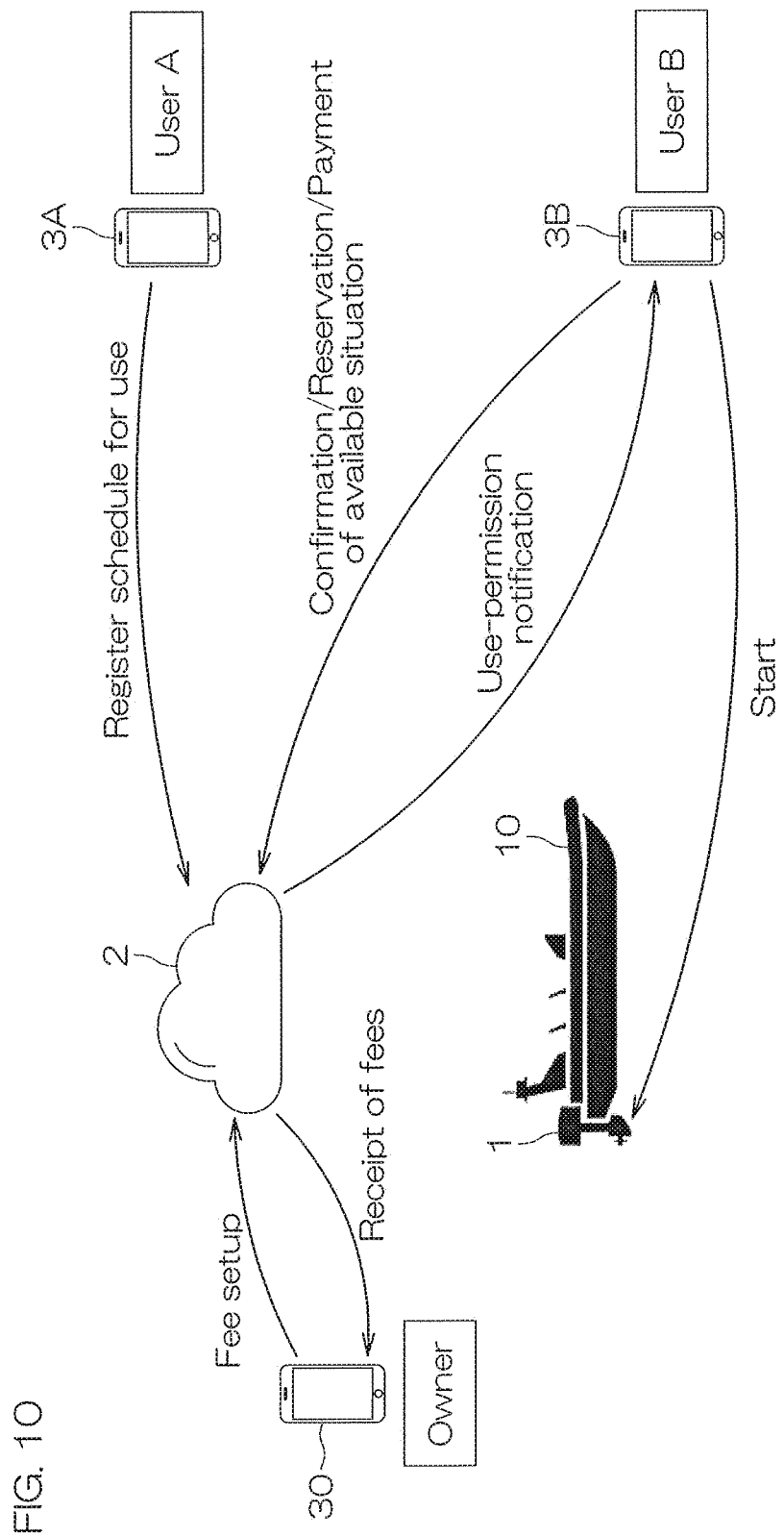
FIG. 10 is a view shown to describe a usage example of the usage management system.

FIG. 10 is a view shown to describe a usage example of the usage management system 100. An owner of the vessel 10 provided with the vessel propulsion apparatus 1 makes a use contract with a user A, and consents that the user A uses the vessel 10 provided with the vessel propulsion apparatus 1 whenever the user A needs to use the vessel 10. However, the user A has a duty to pre-register a schedule for use of the vessel 10 (vessel propulsion apparatus 1) in the use rights management server 2 through his/her own user terminal device 3A. The user terminal device 3A has the same configuration as the user terminal device 3 mentioned above.

Individual use-rights information of the user A is registered in the use rights management server 2 in correlation with the apparatus identification information of the vessel propulsion apparatus 1. This individual use-rights information shows, for example, with respect to the vessel propulsion apparatus 1, that the user A is able to indefinitely use the vessel propulsion apparatus 1. Use-permission in which the expiration date is indefinite is non-volatilely registered in the user terminal device 3A of the user A. Therefore, the use-permission program of the user terminal device 3A is always in an active state. Therefore, the user A communicates with the vessel propulsion apparatus 1 by use of the user terminal device 3A when necessary, and is able to provide use-permission to the vessel propulsion apparatus 1. This makes it possible to operate the vessel propulsion apparatus 1 in the permission mode.

Based on a contract with the owner, the user A registers a scheduled period or a scheduled date of use (hereinafter, referred to simply as "scheduled period of use") in the use rights management server 2 by operating the user terminal device 3A. The use rights management server 2 registers this scheduled period of use as a use-restriction period (information concerning a use period restriction) during which another user has restrictions on the use.

On the other hand, the owner of the vessel 10 can allow a user B other than the user A to temporarily use the vessel 10 when the user A does not use the vessel 10. The user B may be a specific person, or may be an unspecified person. The owner communicates with the use rights management server 2 by use of, for example, an information terminal device 30, and pre-registers a fee for temporary use in the use rights management server 2. The user B who wants temporary use accesses the use rights management server 2 by use of his/her own user terminal device 3B (typically, a device differing from the user terminal device 3A of the user A), and examines an available situation of the vessel 10. The user terminal device 3B has the same configuration as the user terminal device 3 mentioned above.

The use rights management server 2 provides information on an available period for temporary use by the user B to the user terminal device 3B of the user B. A scheduled period of use of the user A and a period for temporary use that has already been registered (reserved) are excluded from the available period. Additionally, a period during which the vessel 10 cannot be provided for the use of the vessel 10 by the user B for other reasons, such as a period for maintenance of the vessel 10 or a period to be used by the owner, is excluded from the available period.

The user B selects a desired period for the use of the vessel 10 from the available period, and transmits a use-permission request from the user terminal device 3B to the use rights management server 2. The use-permission request includes apparatus identification information, user identification information, and a desired use period.

The use rights management server 2 that has received the use-permission request guides a usage-fee settlement method to the user terminal device 3B. The user B settles the usage fee in accordance with the guided settlement method guided. For example, the user B accesses the usage-fee settlement server 8 (see FIG. 1) by use of the user terminal device 3B, and performs settlement procedures.

The settlement method may be a method in which the payment of the usage fee of the vessel 10 is charged to the user B together with the usage fee of the user terminal device 3B (typically, smartphone). In this case, a carrier of the user terminal device 3B demands the payment of the usage fee from the user B, and the carrier pays the usage fee to the owner. Additionally, the settlement method may be settlement performed with a credit card. In this case, a credit card company demands the payment of the usage fee from the user B, and the credit card company pays the usage fee to the owner.

When the settlement procedures of the usage fee are completed in this way, a settlement completion notification is transmitted from the usage-fee settlement server 8 to the use rights management server 2. In response to this, the use rights management server 2 registers individual use rights information of the user B, and transmits a use-permission notification, which states that a desired period of use is a validity period, to the user terminal device 3B of the user B. The individual use rights information of the user B includes user identification information of the user B and validity-period information that represents a desired period of use. In this way, the use-permission program of the user terminal device 3B of the user B enters an active state in the desired period of use. Therefore, the user A communicates with the vessel propulsion apparatus 1 by use of the user terminal device 3B, and is able to provide use-permission to the vessel propulsion apparatus 1. As a result, the vessel propulsion apparatus 1 is able to be operated in a permission mode.

Figure 11:
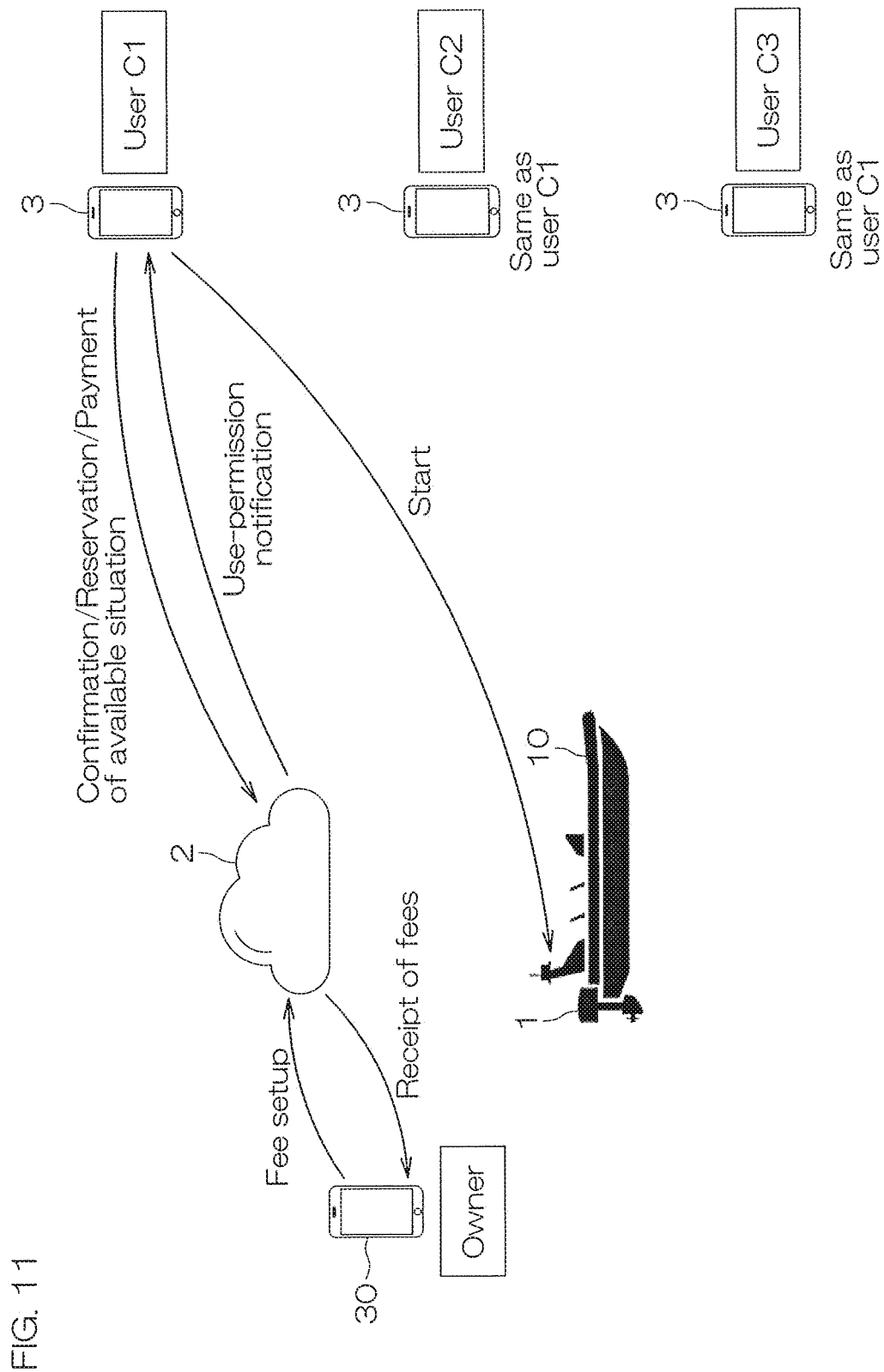
FIG. 11 shows another usage example of the usage management system.

FIG. 11 shows another usage example of the usage management system 100. In this usage example, a user who has use permission during an indefinite period does not exist, and a plurality of users C1 to C3 corresponding to the user B in the usage example of FIG. 10 can share the vessel 10 among them. In this case, the operation of the user terminal device 3 possessed by each user C1 to C3 is the same as the operation of the user terminal device 3B of the user B in the usage example of FIG. 10. Likewise, the operation of the use rights management server 2 is the same as in the user terminal device 3B of the user B in the usage example of FIG. 10. The operation of the user terminal device 3 enables each user C1 to C3 to obtain a use-permission notification, which states that a period during which the vessel is not scheduled to be used by another user is a validity period, from the use rights management server 2, and therefore each user C1 to C3 is able to operate the vessel propulsion apparatus 1 in a permission mode.

Figure 12:
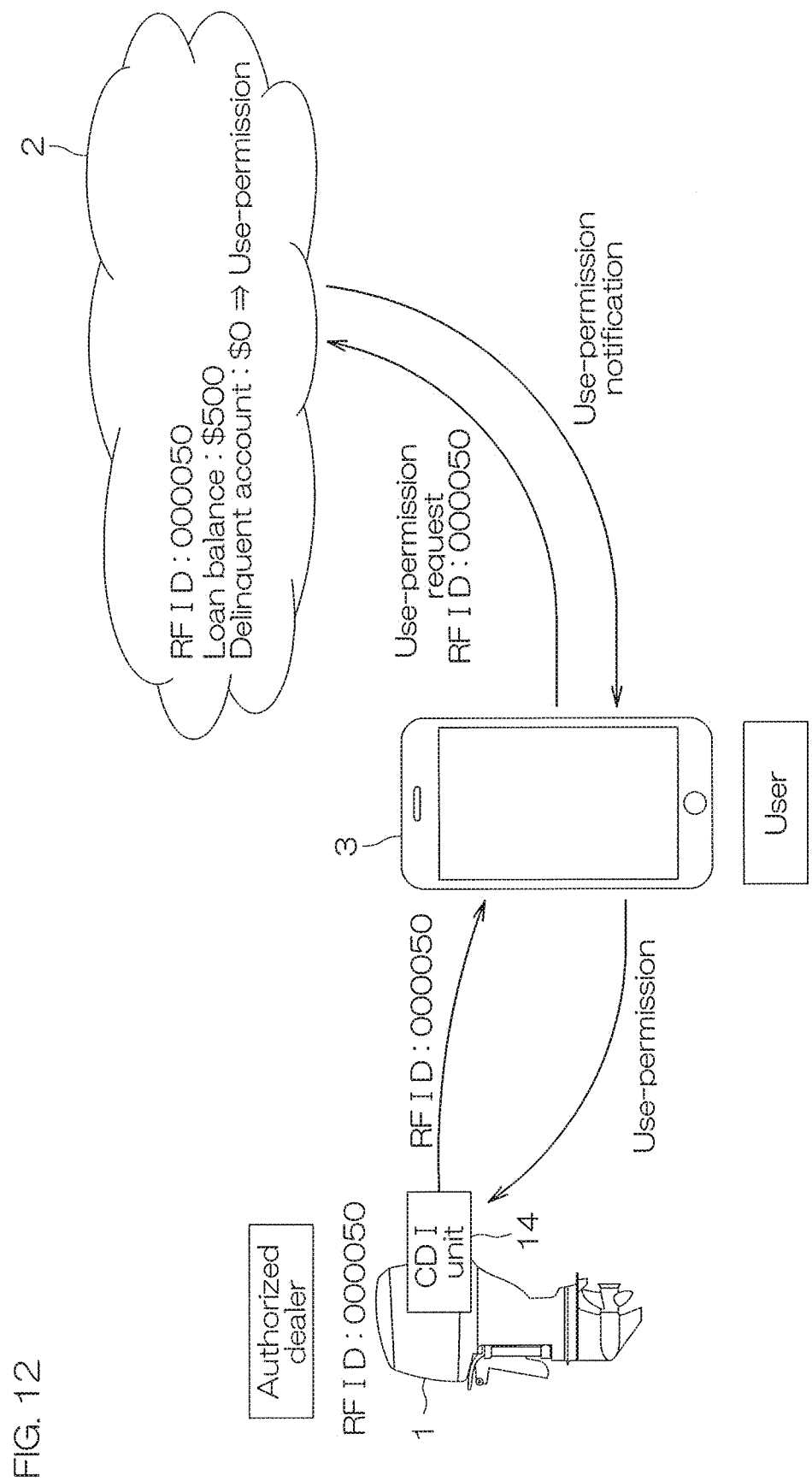
FIG. 12 shows an operation example when the CDI unit breaks down and is required to be replaced with another.

FIG. 12 shows an operation example when the CDI unit 14 breaks down and is required to be replaced with another. The same apparatus identification information as the identification information tag 80 that has been beforehand subjected to pairing is registered in the controller 15 of the CDI unit 14. Therefore, even if the CDI unit 14 detached from another vessel propulsion apparatus 1 having the same specifications is attached to the engine block 13, the prime mover 12 cannot be operated in the permission mode, and only the operation that is performed in the non-permission mode is permitted.

On the other hand, when a new CDI unit 14 is purchased at an authorized dealer that has made a contract with a manufacturer of the vessel propulsion apparatus 1 and when the repair is performed by attaching the new CDI unit 14 to the engine block 13, an operator of the authorized dealer first detaches a broken CDI unit 14. Thereafter, the operator of the authorized dealer attaches the new CDI unit 14 to the engine block 13. Apparatus identification information has not yet been registered in the controller 15 of the new CDI unit 14. Therefore, when the prime mover 12 is started, apparatus identification information read out from the identification information tag 80 by the readout unit 81 is registered in the memory 152 of the controller 15 (see step S23 of FIG. 8 and step S33 of FIG. 9). In this way, the new CDI unit 14 and apparatus identification information held by the identification information tag 80 are paired with each other. Therefore, under the condition that use-permission is provided, an operation is able to be performed in the permission mode.

If a loan is taken out in order to purchase the vessel propulsion apparatus 1, the use rights management server 2 may impart a change in the apparatus identification information to the loan information server 6 (see FIG. 1). In accordance with this, apparatus identification information of loan information in the loan information server 6 is changed. Therefore, the use rights management server 2 is able to obtain appropriate loan information from the loan information server 6 when necessary.

The use-permission issuing program of the user terminal device 3 communicates with the controller 15 of the vessel propulsion apparatus 1, then obtains apparatus identification information, and transmits a use-permission request including the apparatus identification information obtained here and user identification information to the use rights management server 2. The use rights management server 2 searches use rights information of the vessel propulsion apparatus 1 based on the apparatus identification information, and searches individual use rights information based on the user identification information. If a loan is used for payment, the use rights management server 2 communicates with the loan information server 6, and obtains information on a loan payment situation. If there are no arrears in the repayment of the loan, the use rights management server 2 issues a use-permission notification in which a paid-up period is a validity period, and transmits this use-permission notification to the user terminal device 3. Thus, the use-permission issuing program of the user terminal device 3 enters an active state. Therefore, the user is able to provide use-permission to the vessel propulsion apparatus 1 by operating the user terminal device 3. As a result, the vessel propulsion apparatus 1 is able to be operated in a permission mode.

Figure 13:
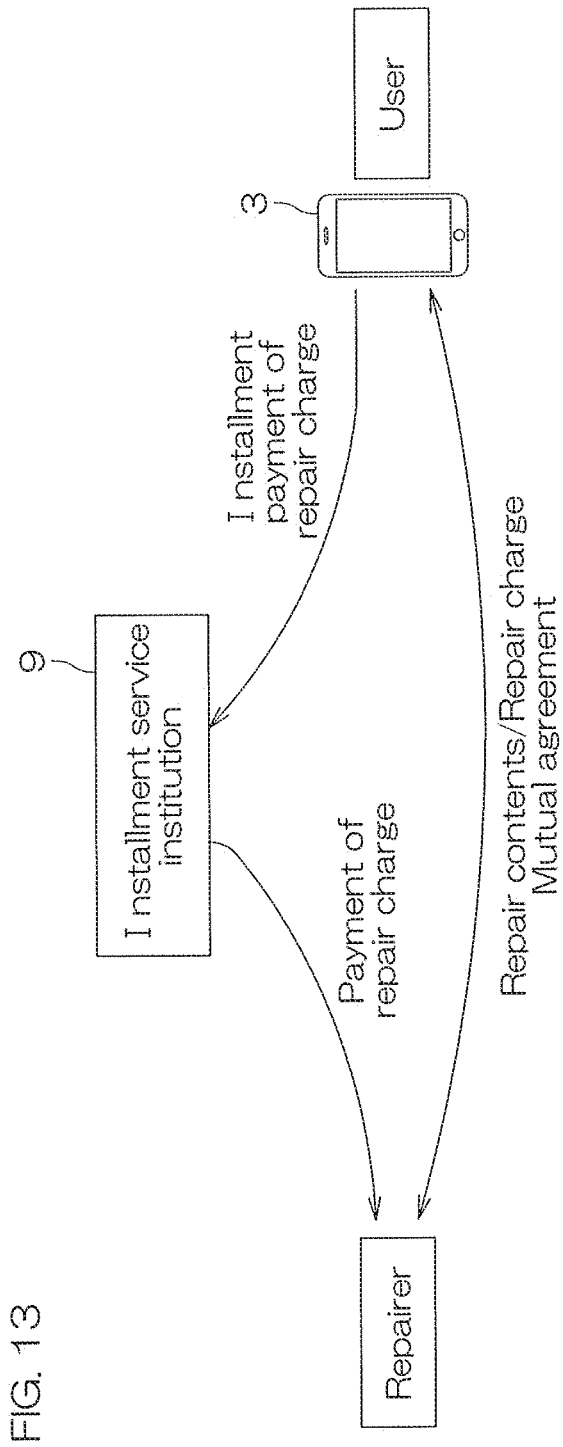
FIG. 13 is a view shown to describe another usage example of the usage management system, and shows an example in which the usage management system is used to pay repair charges in installments.

FIG. 13 is a view shown to describe another usage example of the usage management system 100, and shows an example in which the usage management system 100 is used to pay repair charges in installments. The use-permission issuing program of the user terminal device 3 may be configured to provide installments on repair charges. When there is a need to pay expensive repair charges, such as replacement of the CDI unit 14, the user might request installments on the repair charges. If installment payment is not available, there is a concern that the user will want repairs by use of a third-party-made CDI unit, and, as a result, the vessel propulsion apparatus 1 cannot be used. Therefore, if an installment service institution of, for example, a manufacturer of the vessel propulsion apparatus 1 or group businesses of the manufacturer provide an installment service, a consumer will be able to purchase the vessel propulsion apparatus 1 and will reliably order a repair service without worry.

After agreeing with a repairer (for example, an authorized agency) concerning repair contents and repair cost, the user is able to apply for installments by operating the user terminal device 3 and accessing a server 9 of the installment service institution. The installment service institution determines approval or disapproval based on user's credit information etc., and imparts a determination result to the user terminal device 3. If the installment service institution approves installments, the installment service institution pays repair charges to the repairer (for example, authorized dealer), whereas the installment service institution receives installments from the user.

As described above, according to the present preferred embodiment, the use rights information of the vessel propulsion apparatus 1 is managed by the use rights management server 2. When a use-permission request is transmitted from the user terminal device 3 to the use rights management server 2, the use rights management server 2 that has received this request refers to use rights information concerning the vessel propulsion apparatus 1, and then transmits a use-permission notification or a use-non-permission notification to the user terminal device 3. The user terminal device 3 enters an active state if the use-permission notification is received from the use rights management server 2, and can provide use-permission to the controller 15 of the vessel propulsion apparatus 1. If the user terminal device 3 does not receive the use-permission notification, the user terminal device 3 enters a non-active state, and cannot issue use-permission. If use-permission is provided from the user terminal device 3, the controller 15 of the vessel propulsion apparatus 1 operates the prime mover 12 in a permission mode, and if use-permission is not provided, the controller 15 operates the prime mover 12 in a non-permission mode. In the permission mode, a prime mover output exceeding a predetermined limit output is permitted, and the vessel propulsion apparatus 1 is able to generate a large thrust if necessary. In the non-permission mode, the prime mover output exceeding the predetermined limit output is prohibited, and the vessel propulsion apparatus 1 cannot generate a large thrust although the vessel propulsion apparatus 1 is able to generate some thrust.

Thus, it is possible to operate the prime mover 12 in the permission mode or in the non-permission mode based on the use rights information managed by the use rights management server 2, thus making it possible to manage the use of the vessel propulsion apparatus 1. Additionally, it is possible to operate the prime mover 12 within a range not exceeding the predetermined limit output, and possible to generate a thrust from the vessel propulsion apparatus 1 even in the non-permission mode. Therefore, the use regulation of the vessel propulsion apparatus 1 does not disable the vessel 10 to sail. Thus, it is possible to provide the usage management system 100 that is able to appropriately manage the use of the vessel propulsion apparatus 1.

On the other hand, if the vessel propulsion apparatus 1 is stolen, the vessel propulsion apparatus 1 cannot be operated in the permission mode because use rights information of a thief is not registered in the use rights management server 2. The vessel propulsion apparatus 1 in this state has a greatly-reduced value, and thus is less likely to become stolen. Therefore, it is possible to reduce or avoid the theft loss of the vessel propulsion apparatus 1.

The prime mover 12 is an internal combustion engine in a preferred embodiment described above. The prime mover 12 includes the flywheel magneto 52 that rotates in response to the rotation of the crankshaft 51 of the internal combustion engine. The prime mover 12 additionally includes the charge coil 53 that generates electric power by the rotation of the flywheel magneto 52 and the ignition coil 55 that is operated by the electric power generated by the charge coil 53. The prime mover 12 still additionally includes the pulsar coil 54 that generates an ignition timing signal in accordance with the rotation of the flywheel magneto 52 and the ignition plug 56 that generates a spark discharge by a power supply from the ignition coil 55. The controller 15 is incorporated into the CDI unit 14. The CDI unit 14 is configured to pass an electric current through the ignition coil 55 in accordance with a timing signal generated by the pulsar coil 54 and to allow the ignition plug 56 to generate a spark discharge. The controller 15 controls the spark discharge generated by the ignition plug 56 (more specifically, controls an electric current flowing through the ignition coil 55), and thus achieves the operation of the prime mover 12 in the permission mode and in the non-permission mode. As thus described, it is possible to achieve the operation in the permission mode and in the non-permission mode by using the ignition system of the internal combustion engine.

The controller 15 and circuits in the CDI unit 14 are actuated by the electric power generated by the charge coil 53, and therefore the operation is able to be performed in the permission mode and in the non-permission mode without installing a battery. Therefore, the use of the vessel propulsion apparatus 1 is able to be appropriately managed even in a situation in which a battery is not provided.

In the CDI unit 14 having the configuration example shown in FIG. 2 described above, the anti-ignition thyristor 64 and the over-revolution determination circuit 66 configure the ignition disabling circuit 70 that disables an operation that passes an electric current through the ignition coil 55 in accordance with a timing signal generated by the pulsar coil 54 when the rotation speed of the prime mover 12 reaches a rotation speed limit. Therefore, the operation of the prime mover 12 at a rotation speed exceeding the rotation speed limit is prohibited. The controller 15 changes the amplification rate of the amplifier circuit 69 included in the over-revolution determination circuit 66, and thus sets a first rotation speed (for example, 6000 rpm), which is comparatively high in the permission mode, at the rotation speed limit. Therefore, the vessel propulsion apparatus 1 is able to generate a large thrust. On the other hand, in the non-permission mode, the controller 15 sets a second rotation speed (for example, 2000 rpm), which is lower than the first rotation speed. Therefore, the vessel propulsion apparatus 1 cannot generate a large thrust although it is possible to generate some thrust. As thus described, the use of the ignition disabling circuit 70 enables the operation to be performed in the permission mode and in the non-permission mode, and enables the use of the vessel propulsion apparatus 1 to be appropriately managed.

In the CDI unit 14 having a configuration example shown in FIG. 3 described above, the controller 15 energizes the operating ignition thyristor 76, and passes an electric current through the ignition coil 55 at a timing at which a phase shift has been made based on the rotation speed of the prime mover 12 with respect to a timing signal generated by the pulsar coil 54 in the permission mode. On the other hand, in the non-permission mode, the controller 15 disables the phase shift. More specifically, the operating ignition thyristor 76 is maintained in a cutoff state, and the starting ignition thyristor 75 is energized at a timing of a timing signal generated by the pulsar coil 54 by the starting gate circuit 77 even after starting the prime mover 12. Therefore, in the permission mode, an electric current is passed through the ignition coil 55 at a timing at which a phase shift has been appropriately made based on the prime mover rotation speed with respect to a timing signal, thus making it possible to ignite fuel at an appropriate timing and making it possible for the internal combustion engine to generate a large output. On the other hand, in the non-permission mode, the phase shift enters a disabled state, and therefore the ignition timing deviates from an optimal timing, and therefore the internal combustion engine is not able to generate a large output. Thus, the enabled/disabled setting of a phase shift that optimizes an ignition timing makes it possible to perform the operation in the permission mode and in the non-permission mode, and makes it possible to appropriately manage the use of the vessel propulsion apparatus 1.

In a preferred embodiment described above, the CDI unit 14 is undetachably fixed to the engine block 13. On the other hand, the identification information tag 80 is detachably fixed to the engine block 13. The CDI unit 14 includes the readout unit 81 that reads out identification information from the identification information tag 80, and the readout unit 81 is connected to the controller 15. When the readout unit 81 does not read out pre-registered identification information, the controller 15 operates the prime mover 12 in the non-permission mode. As thus described, the engine block 13 and the CDI unit 14 are beforehand paired with each other according to identification information, and, if a thus-paired combination cannot be obtained, the prime mover 12 cannot be operated in the permission mode. Therefore, even if the CDI unit 14 is transplanted from the single vessel propulsion apparatus 1 to another vessel propulsion apparatus 1, the prime mover 12 cannot be operated in the permission mode. Additionally, the identification information tag 80 is fixed to the engine block 13, and cannot be detached from the engine block 13. More specifically, if attempts to detach the identification information tag 80 from the engine block 13 are made, the identification information tag 80 or the engine block 13 will be broken. Therefore, it is also impossible to transplant the CDI unit 14 and the identification information tag 80 that have been paired with each other from the single vessel propulsion apparatus 1 to another vessel propulsion apparatus 1. Therefore, it is impossible to circumvent the output limitation imposed by the non-permission mode by the transplant of the CDI unit 14, thus making it possible to appropriately manage the use of the vessel propulsion apparatus 1.

In a preferred embodiment described above, the identification information of the identification information tag 80 paired with the CDI unit 14 is registered in the use rights management server 2 as the apparatus identification information of the vessel propulsion apparatus 1. This makes it possible to identify the vessel propulsion apparatus 1 by the identification information of the identification information tag 80 and to appropriately manage use rights information concerning a plurality of vessel propulsion apparatuses 1 by the use rights management server 2.

There is a case in which the CDI unit 14 is broken and is required to be replaced with a normal CDI unit 14. For such a case, a manufacturer of the vessel propulsion apparatus 1 or an authorized component manufacturer provides a CDI unit 14 as a replacement part. For repair, an operator detaches the broken CDI unit 14 from the engine block 13, and, instead, attaches a new CDI unit 14 to the engine block 13. The controller 15 of the CDI unit 14 is configured such that it can be paired with the identification information tag 80 only once. More specifically, when the new CDI unit 14 is attached to the engine block 13 and then the prime mover 12 is started, apparatus identification information read out from the identification information tag 80 by the readout unit 81 is registered in the memory 152 of the controller 15, and, as a result, pairing is achieved. After this, the CDI unit 14 that has been paired cannot be paired with another vessel propulsion apparatus, because the apparatus identification information written in the memory 152 cannot be rewritten.

In a preferred embodiment described above, the use rights management server 2 is able to issue a use-permission notification accompanied by validity-period information based on use rights information. When a use-permission notification is accompanied by validity-period information, the user terminal device 3 determines whether it is within a validity period indicated by the validity-period information, and, if it is within the validity period, the user terminal device 3 enters an active state, and, if it is outside the validity period, the user terminal device 3 enters a non-active state. Therefore, the user terminal device 3 is able to issue a use-permission and provide it to the controller 15 only within the validity period, and therefore the prime mover 12 is able to be operated in the permission mode only within the validity period. If it is outside the validity period, the prime mover 12 is able to be operated only in the non-permission mode, and only the generation of a small thrust is permitted. Thus, it is possible to limit the output of the prime mover 12 based on the validity-period information, thus making it possible to appropriately manage the use of the vessel propulsion apparatus 1.

In a preferred embodiment described above, the memory 32 that is a storage device included in the user terminal device 3 has a nonvolatile storage area that is able to non-volatilely store a use-permission notification. The use-permission notification is non-volatilely stored, and, as a result, even when the vessel 10 is far away from land and when the user terminal device 3 cannot communicate with the use rights management server 2, the user terminal device 3 reads out the use-permission notification held in the memory 32, and can reach an active state. When validity-period information is included in the use-permission notification stored in the memory 32, the user terminal device 3 determines whether it is within a validity period indicated by the validity-period information, and, if it is within the validity period, the user terminal device 3 enters the active state, and, if it is outside the validity period, the user terminal device 3 enters the non-active state. Thus, it is possible to operate the prime mover 12 in the permission mode or in the non-permission mode based on the use-permission notification non-volatilely stored in the memory 32 of the user terminal device 3 even when the user terminal device 3 is in a state in which the user terminal device 3 cannot communicate with the use rights management server 2.

A permission-mode/non-permission-mode determination based on the validity period may be made in the controller 15 as shown in the example of FIG. 9. In other words, when a use-permission notification provided from the use rights management server 2 is accompanied by validity-period information, the user terminal device 3 provides the validity-period information and use-permission (permission status information) to the controller 15. Thereafter, when the use-permission and the validity-period information are provided from the user terminal device 3, the controller 15 determines whether it is within a validity period indicated by the validity-period information when the operation of the prime mover 12 is started, and, if it is within the validity period, the controller 15 operates the prime mover 12 in the permission mode, and, if it is outside the validity period, the controller 15 operates the prime mover 12 in the non-permission mode. Therefore, the prime mover 12 is able to be operated in the permission mode only within the validity period. If it is outside the validity period, the prime mover 12 is able to be operated only in the non-permission mode, and only the generation of a small thrust is permitted. Thus, it is possible to limit the output of the prime mover 12 based on the validity-period information, thus making it possible to appropriately manage the use of the vessel propulsion apparatus 1.

Preferably, when the operation is thus performed, the memory 152 that is a storage device of the controller 15 non-volatilely stores use-permission and validity-period information (permission status information). Thus, even when the vessel 10 is far away from land and when the user terminal device 3 cannot communicate with the use rights management server 2 and when the user terminal device 3 cannot issue use permission, the controller 15 is able to read out the use permission held in the memory 152, and to operate the prime mover 12 in the permission mode. When the use-permission and the validity-period information are stored in the memory 152, the controller 15 operates the prime mover 12 in the permission mode within the validity period indicated by the validity-period information without obtaining use permission from the user terminal device 3. Additionally, outside the validity period indicated by the validity-period information, the controller 15 operates the prime mover 12 in the non-permission mode if use permission is not provided from the user terminal device 3. Thus, it is possible to operate the prime mover 12 in the permission mode or in the non-permission mode based on the use-permission notification non-volatilely stored in the memory 152 of the controller 15 even when the user terminal device 3 is in a state in which the user terminal device 3 cannot communicate with the use rights management server 2.

In a preferred embodiment described above, use rights information to which the use rights management server 2 refers includes at least one among information concerning a loan payment situation of purchase money of the vessel propulsion apparatus 1, information concerning a payment situation of rental charges of the vessel propulsion apparatus 1, or information concerning a use period restriction of the vessel propulsion apparatus 1. As a result, based on information concerning a loan payment situation, a rental-charges payment situation, a use period restriction, etc., the use rights management server 2 is able to issue a use-permission notification or a use-non-permission notification. The prime mover 12 can be operated in the non-permission mode even when a use-non-permission notification is issued, and therefore the vessel 10 is able to travel although a large thrust cannot be obtained. Thus, it is possible to appropriately limit the output of the prime mover 12, thus making it possible to appropriately manage the use of the vessel propulsion apparatus 1.

In a preferred embodiment described above, the controller 15 maintains the permission mode without changing to the non-permission mode while operating the prime mover 12 in the permission mode. In other words, the controller 15 does not change to the non-permission mode while the prime mover 12 is being operated in the permission mode. Therefore, the output of the prime mover 12 is not greatly reduced while the prime mover 12 is being operated, and therefore the thrust of the vessel propulsion apparatus 1 is not greatly reduced. Thus, it is possible to appropriately manage the use of the vessel propulsion apparatus 1 while appropriately limiting the output of the prime mover 12.

The use-permission program (computer program) executed by the user terminal device 3 may be provided as an application program that is downloadable from the application server 5. In this case, the application server 5 can be a recording medium that has recorded the use-permission program. Additionally, the memory 32 of the user terminal device 3 can be a recording medium that has recorded the use-permission program in a state in which the use-permission program has been downloaded to the user terminal device 3. Of course, this type of use-permission program may be provided in a state of being recorded in a recording medium typified by CD-ROM, DVD-ROM, memory card, and USB thumb drive.

Although preferred embodiments of the present invention have been described as above, the present invention can be embodied in still other modes, and various design changes can be made within the scope of the matter described in the appended claims.

For example, the prime mover 12 may be an electric motor as described above without being limited to an internal combustion engine. Additionally, the internal combustion engine may be a four-stroke internal combustion engine without being limited to a two-stroke internal combustion engine. Additionally, a use-permission program may be created so that a person who does not have use rights can examine a loan payment situation based on apparatus identification information by introducing the use-permission program into the user terminal device 3. More specifically, the use rights management server 2 may provide information concerning a loan payment situation to the user terminal device 3 even when a use-non-permission notification is issued. This enables a person who is to acquire a vessel propulsion apparatus 1 to ascertain the presence or absence of remaining debts concerning the vessel propulsion apparatus 1, thus making it possible to safely conduct a transaction. With respect to the selling-off of the vessel propulsion apparatus 1, it is usual to pay off a loan with proceeds from the sale of the vessel propulsion apparatus 1 if there are remaining debts of a loan. Thus, it is possible to register use-rights information, which has set an indefinite validity period, in the use rights management server 2, thus making it possible to deliver the vessel propulsion apparatus 1 to a purchaser in a state in which the vessel propulsion apparatus 1 is operable in the permission mode without the limitations of periods.

Additionally, in the preferred embodiments described above, wireless communication typified by near field communication, such as Wi-Fi (registered trademark), Bluetooth (registered trademark), or infrared communication, has been mentioned as an example with respect to communication between the controller 15 and the user terminal device 3. However, in addition to these communications, data communication between the user terminal device 3 and the controller 15 may be achieved such that a bar code or a QR code (registered trademark) (two-dimensional bar code) displayed on the user terminal device 3 is read by a readout device, such as a camera connected to the controller 15 side.

Additionally, the use rights management server 2 is not necessarily required to be a single device, and may include, for example, a plurality of computers connected to the network 4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A usage management system for a vessel propulsion apparatus including a thrust generator, a prime mover and a controller, the usage management system comprising:
   a use rights management server to manage use rights information of a vessel propulsion apparatus that provides a thrust to a vessel; and
   a user terminal to exchange data communication with the vessel propulsion apparatus and with the use rights management server; wherein
   the controller is configured or programmed to communicate with the user terminal, to operate the prime mover in a permission mode to permit an output exceeding a predetermined limit output if use permission is provided from the user terminal, and to operate the prime mover in a non-permission mode to prohibit the output exceeding the predetermined limit output if use permission is not provided from the user terminal;
   the user terminal is operable to transmit a use-permission request with identifications of the vessel propulsion apparatus and a user to the use rights management server, to enter an active state to allow issuance of use permission to the controller if a use-permission notification is received from the use rights management server, and to enter a non-active state to prohibit issuance of use permission to the controller if a use-permission notification is not received from the use rights management server; and
   the use rights management server is operable to refer to use rights information concerning the vessel propulsion apparatus when a use-permission request with identifications of the vessel propulsion apparatus and the user is received from the user terminal, and to transmit a use-permission notification or a use-non-permission notification to the user terminal in accordance with the use rights information.

2. The usage management system according to claim 1, wherein
   the prime mover includes an internal combustion engine, a flywheel magneto to rotate in response to rotation of a crankshaft of the internal combustion engine, a charge coil to generate electricity by the rotation of the flywheel magneto, an ignition coil to operate by electric power generated by the charge coil, a pulsar coil to generate an ignition timing signal in accordance with the rotation of the flywheel magneto, and an ignition plug to cause a spark discharge by the power supply from the ignition coil;
   the controller is provided in a capacitor discharge injection (CDI) ignition that passes an electric current through the ignition coil in accordance with the ignition timing signal generated by the pulsar coil and generates the spark discharge in the ignition plug; and
   the controller is configured or programmed to execute an operation of the prime mover in the permission mode and in the non-permission mode by controlling the spark discharge from the ignition plug.

3. The usage management system according to claim 2, wherein
   the CDI ignition includes an ignition disabling circuit to disable an operation that passes the electric current through the ignition coil in accordance with the ignition timing signal generated by the pulsar coil when a rotation speed of the prime mover reaches a rotation speed limit; and
   the controller is configured or programmed to set a first rotation speed at the rotation speed limit in the permission mode and to set a second rotation speed lower than the first rotation speed in the non-permission mode.

4. The usage management system according to claim 2, wherein the controller is configured or programmed to pass the electric current through the ignition coil at a timing subjected to a phase shift with respect to the ignition timing signal generated by the pulsar coil in the permission mode and to disable the phase shift in the non-permission mode.

5. The usage management system according to claim 2, wherein
   the CDI ignition is detachably fixed to an engine block of the prime mover;
   an identification information tag to identify the vessel propulsion apparatus is fixed to the engine block;
   the CDI ignition includes a readout unit connected to the controller and operable to read out identification information from the identification information tag; and
   the controller is configured or programmed to operate the prime mover in the non-permission mode when the readout unit does not read out the identification information.

6. The usage management system according to claim 1, wherein
   the use rights management server is operable to issue a use-permission notification accompanied by a validity-period information based on the use rights information; and
   the user terminal is operable to determine whether a current time is within a validity period indicated by the validity-period information when the use-permission notification is accompanied by the validity-period information, and to enter the active state if the current time is within the validity period, and to enter the non-active state if the current time is outside the validity period.

7. The usage management system according to claim 6, wherein
   the user terminal includes a storage to non-volatilely store the use-permission notification; and
   the user terminal is operable to determine whether the current time is within a validity period indicated by the validity-period information when the use-permission notification stored in the storage is accompanied by the validity-period information, to enter the active state if the current time is within the validity period, and to enter the non-active state if the current time is outside the validity period.

8. The usage management system according to claim 1, wherein
   the use rights management server is operable to issue a use-permission notification accompanied by validity-period information based on the use rights information;
   the user terminal is operable to provide the validity-period information and use-permission to the controller when the use-permission notification is accompanied by the validity-period information; and
   when the use-permission and the validity-period information are provided from the user terminal, the controller is configured or programmed to determine whether the current time is within the validity period indicated by the validity-period information when the operation of the prime mover is started, to operate the prime mover in the permission mode if the current time is within the validity period, and to operate the prime mover in the non-permission mode if the current time is outside the validity period.

9. The usage management system according to claim 8, wherein the controller includes a storage to non-volatilely store the use-permission and the validity-period information; and the controller is configured or programmed to, when the use-permission and the validity-period information are stored in the storage, to operate the prime mover in the permission mode without obtaining the use-permission from the user terminal within the validity period indicated by the validity-period information, and to operate the prime mover in the non-permission mode outside the validity period indicated by the validity-period information if the use-permission is not provided from the user terminal.

10. The usage management system according to claim 1, wherein the use rights information to which the use rights management server refers includes at least one among information concerning a loan payment situation of purchase money of the vessel propulsion apparatus, information concerning a payment situation of rental charges of the vessel propulsion apparatus, or information concerning a use period restriction of the vessel propulsion apparatus.

11. The usage management system according to claim 1, wherein the controller is configured or programmed to maintain the permission mode without changing to the non-permission mode while operating the prime mover in the permission mode.

12. A vessel propulsion apparatus to be managed by the usage management system according to claim 1, the vessel propulsion apparatus comprising:

a thrust generator;

a prime mover to drive the thrust generator; and a controller configured or programmed to communicate with the user terminal, to operate the prime mover in a permission mode to permit an output exceeding a predetermined limit output if use permission is provided from the user terminal, and to operate the prime mover in a non-permission mode to prohibit the output exceeding the predetermined limit output if use permission is not provided from the user terminal.

13. A user terminal for use in the usage management system according to claim 1, wherein the user terminal is operable to exchange data communication with both the vessel propulsion apparatus and the use rights management server;

the user terminal is operable to transmit a use-permission request with identifications of the vessel propulsion apparatus and a user to the use rights management server, to enter an active state to allow issuance of use permission to the controller if a use-permission notification is received from the use rights management server, and to enter a non-active state to prohibit issuance of use permission to the controller if a use-permission notification is not received from the use rights management server.

14. A non-transitory recording medium that has recorded a computer program to allow a computer to function as the user terminal according to claim 13 by being executed by the computer.

15. A use rights management server usable in the usage management system according to claim 1, wherein the use rights management server is operable to exchange data communication with the user terminal, to manage use rights information of the vessel propulsion apparatus, and to manage use rights information of the vessel propulsion apparatus;

the use rights management server is operable to refer to use rights information concerning the vessel propulsion apparatus when a use-permission request that has identified the vessel propulsion apparatus and the user is received from the user terminal, and to transmit a use-permission notification or a use-non-permission notification to the user terminal in accordance with the use rights information.

* * * * *